United States Patent
Wang et al.

(10) Patent No.: US 12,108,339 B2
(45) Date of Patent: Oct. 1, 2024

(54) METHODS FOR TRANSMITTING AND DETECTING PHYSICAL DOWNLINK CONTROL CHANNEL, NETWORK DEVICE, AND USER EQUIPMENT

(71) Applicant: DATANG MOBILE COMMUNICATIONS EQUIPMENT CO., LTD., Beijing (CN)

(72) Inventors: Jiaqing Wang, Beijing (CN); Fangchen Cheng, Beijing (CN); Meiying Yang, Beijing (CN); Zheng Zhao, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 325 days.

(21) Appl. No.: 17/633,561

(22) PCT Filed: Aug. 7, 2020

(86) PCT No.: PCT/CN2020/107782
§ 371 (c)(1),
(2) Date: Feb. 7, 2022

(87) PCT Pub. No.: WO2021/023297
PCT Pub. Date: Feb. 11, 2021

(65) Prior Publication Data
US 2022/0295404 A1    Sep. 15, 2022

(30) Foreign Application Priority Data
Aug. 8, 2019 (CN) .......................... 201910729369.9

(51) Int. Cl.
*H04W 52/02*    (2009.01)

(52) U.S. Cl.
CPC ................................ *H04W 52/0235* (2013.01)

(58) Field of Classification Search
CPC . H04L 27/2602; H04L 5/0023; H04L 5/0048; H04L 5/0053; H04L 5/0091;
(Continued)

(56) References Cited

U.S. PATENT DOCUMENTS

| 11,290,958 | B2 * | 3/2022 | Wu | ..................... H04W 52/028 |
| 2010/0027506 | A1 | 2/2010 | Tanigawa et al. | |

(Continued)

FOREIGN PATENT DOCUMENTS

| CN | 1898914 A | 1/2007 |
| CN | 101518125 A | 8/2009 |

(Continued)

OTHER PUBLICATIONS

Extended European Search Report for European Patent Application 20850892.9 issued on Aug. 18, 2022.
(Continued)

*Primary Examiner* — Robert J Lopata
(74) *Attorney, Agent, or Firm* — Ladas & Parry, LLP

(57) ABSTRACT

The disclosure provides methods for transmitting and detecting a physical downlink control channel, a network device and a UE. The method for transmitting a physical downlink control channel includes: transmitting a physical downlink control channel (PDCCH) to a UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

14 Claims, 8 Drawing Sheets

(58) Field of Classification Search
CPC ......... H04W 52/0216; H04W 52/0235; H04W 52/028; H04W 72/23; H04W 76/28
USPC ........................................................ 370/329
See application file for complete search history.

(56) References Cited

U.S. PATENT DOCUMENTS

| | | | |
|---|---|---|---|
| 2013/0034355 A1 | 2/2013 | Zhang et al. | |
| 2017/0289969 A1 | 10/2017 | Zhou et al. | |
| 2018/0092007 A1 | 3/2018 | Ekici et al. | |
| 2018/0368115 A1 | 12/2018 | Li et al. | |
| 2019/0045495 A1 | 2/2019 | Chen et al. | |
| 2020/0229093 A1* | 7/2020 | Ahmad | H04W 72/23 |
| 2020/0280995 A1 | 9/2020 | Ma et al. | |
| 2020/0322946 A1 | 10/2020 | Jiang et al. | |
| 2021/0051584 A1* | 2/2021 | Cheng | H04W 72/21 |
| 2021/0243694 A1 | 8/2021 | Li et al. | |
| 2021/0259044 A1* | 8/2021 | Islam | H04W 52/0229 |
| 2022/0053529 A1* | 2/2022 | Nimbalker | H04L 5/0053 |
| 2022/0104132 A1* | 3/2022 | Wu | H04W 52/0232 |
| 2022/0159574 A1* | 5/2022 | Islam | H04W 52/0219 |
| 2022/0182938 A1* | 6/2022 | Ye | H04W 52/0232 |

FOREIGN PATENT DOCUMENTS

| | | |
|---|---|---|
| CN | 102404047 A | 4/2012 |
| CN | 104969631 A | 10/2015 |
| CN | 106793097 A | 5/2017 |
| CN | 107872854 A | 4/2018 |
| CN | 109496446 A | 3/2019 |
| CN | 109802755 A | 5/2019 |
| CN | 109963339 A | 7/2019 |
| CN | 111757437 A | 10/2020 |
| TW | 201911925 A | 3/2019 |
| WO | 2014134807 A | 9/2014 |
| WO | 2018128875 A1 | 7/2018 |
| WO | 2018174635 A1 | 9/2018 |

OTHER PUBLICATIONS

"PDCCH-based power saving channel design," 3GPP TSG-RAN WG1 #96bis, R1-1905031, Xi'an, China, Apr. 8-12, 2019, Agenda item: 7.2.9.1, Source: Qualcomm Incorporated, all pages.
"PDCCH-based power saving channel design," 3GPP TSG-RAN WG1 #97, R1-1907294, Reno, USA, May 13-17, 2019, Agenda item: 7.2.9.1, Source: Qualcomm Incorporated, all pages.
First Office Action for Japanese Patent Application No. 2022-506658 issued on Jan. 24, 2023 by the Japanese Patent Office, and its English Translation provided by the Japanese Patent Office.
"PDCCH-based power saving signal/channel" 3GPP TSG RAN WG1 #96bis R1-1905384, Apr. 8-Apr. 12, 2019, Agenda Item: 7.2.9.1, Source: Nokia, Nokia Shanghai Bell, all pages.
"PDCCH-based Power Saving Signal Design Considerations" 3GPP TSG RAN WG1#96b R1-1905409, Xi'an, China, Apr. 8-12, 2019, Agenda Item: 7.2.9.1, Source: InterDigital, INc., all pages.
"PDCCH-Based Power Saving Signal/Channel Design" 3GPP TSG RAN WG1 #97 R1-1906350, Reno, USA, May 13-17, 2019, Agenda Item: 7.2.9.1, Source: CATT, all pages.
"Design of PDCCH-based power saving signal/channel" 3GPP TSG-RAN WG1 Meeting #97 Tdoc R1-1907322, Reno, USA, May 13-17, 2019, Agenda Item: 7.2.9.1, Source: Ericsson, all pages.
"Design of PDCCH-based Power Savings Signal and Channel" 3GPP TSG RAN WG1 #97 R1-1907345, Reno, USA, May 13-17, 2019, Agenda Item: 7.2.9.1, Source: Apple Inc., all pages.
International Search Report for PCT Application PCT/CN2020/107782 issued on Nov. 12, 2020 and its English Translation provided by WIPO.
Written Opinion for PCT Application PCT/CN2020/107782 issued on Nov. 12, 2020, and its English Translation provided by WIPO.
Internationally Preliminary Report on Patentability for PCT/CN2020/107782 issued on Feb. 8, 2022, and English translation provided by WIPO.
First Office Action for Chinese Patent Application 201910729369.9 issued on Jun. 3, 2021, and its English translation provided by Global dossier.
Second Office Action for Chinese Patent Application 201910729369.9 issued on Nov. 8, 2021 and its English translation provided by Global dossier.
"Aspects to address in the Design of PDCCH-based Power Saving Signal/Channel," 3GPP TSG RAN WG1 #96bis R1-1905846, Xian, China, Apr. 8-12, 2019, Agenda Item: 7.2.9.1, Source: CATT, all pages.
"Discussion on PDCCH-based power saving signal/channel," 3GPP TSG RAN WG1 #97, R1-1906579, Reno, USA, May 13-17, 2019, Agenda item: 7.2.9.1, Source: OPPO , all pages.
"Summary of PDCCH-based Power Saving Signal/CHannel," 3GPP TSG RAN WG1 #96bis, R1-1905676, Xian, China, Apr. 8-12, 2019, Agenda Item: 7.2.9.1, Source: CATT, all pages.
"Summary of PDCCH-based Power Saving Signal/CHannel," 3GPP TSG RAN WG1 #96bis, R1-1905791, Xian, China, Apr. 8-12, 2019, Agenda Item: 7.2.9.1, Source: CATT, all pages.
"Discussion on PDCCH-based power saving signal/channel (PoSS)," 3GPP TSG RAN WG1 #07, R1-1907363, Source: Panasonic, Agenda Item: 7.2.9.1, all pages.
"Summary of PDCCH-based Power Saving Signal/Channel," 3GPP TSG RAN WG1 #97, R1-1907809, Reno, China, May 13-17, 2019, Agenda Item: 7.2.9.1, Source: CATT, all pages.

* cited by examiner

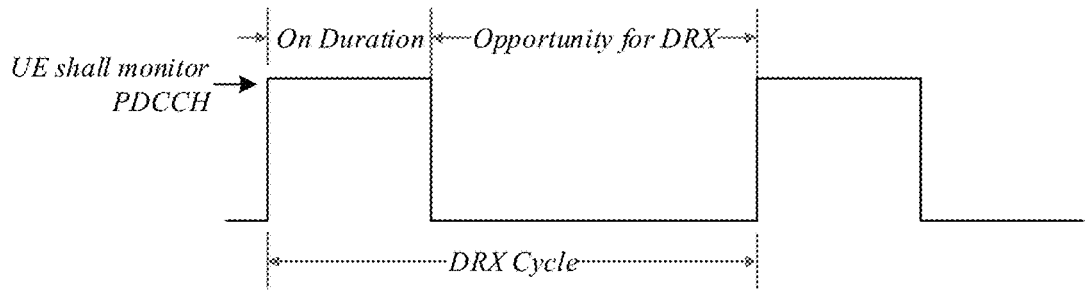
Fig. 1
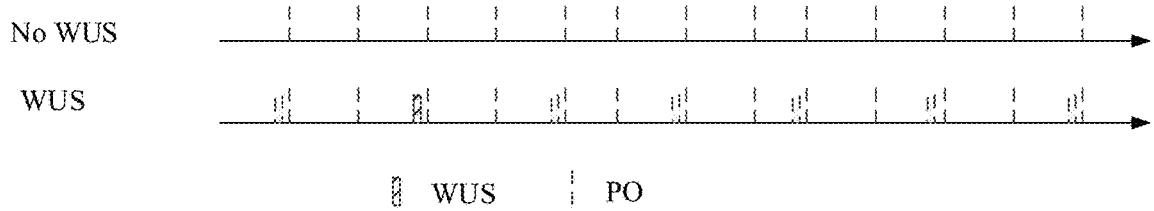
Fig. 2
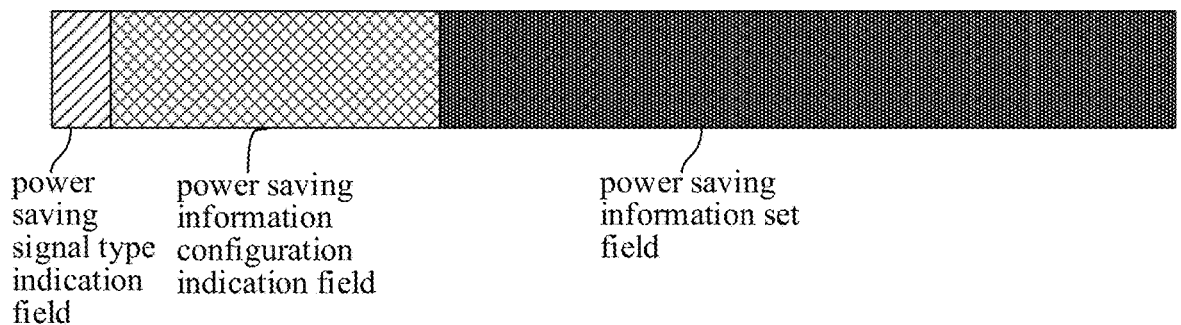
Fig. 3
Fig. 4 power saving
signal type
indication field power saving
information
set field power saving
information
configuration
indication field power saving
information
set field

METHODS FOR TRANSMITTING AND DETECTING PHYSICAL DOWNLINK CONTROL CHANNEL, NETWORK DEVICE, AND USER EQUIPMENT

CROSS-REFERENCE TO RELATED APPLICATIONS

The present application is a U.S. national phase application of a PCT Application No. PCT/CN2020/107782 filed on Aug. 7, 2020, which claims a priority to the Chinese patent application No. 201910729369.9 filed in China on Aug. 8, 2019, the disclosures of which are incorporated herein by reference in their entireties.

TECHNICAL FIELD

The present disclosure relates to the field of communication technology and, in particular to a method for transmitting a physical downlink control channel, a method for detecting a physical downlink control channel, a network device and a UE.

BACKGROUND

In the 5G NR (New Radio) system, UE (user equipment or terminal) works in three states: RRC_IDLE (radio resource control idle state), RRC_Inactive (radio resource control inactive state) and RRC_Connected (radio resource control connected state). UE in the first two states needs to monitor a paging signal. The receipt of the paging signal by the UE means that the network side has data to send, and the UE needs to enter the RRC_Connected state to receive downlink data. In the RRC_Connected state, the UE needs to continuously listen to a physical downlink control channel (PDCCH), to obtain information about transmission of a physical downlink shared channel (PDSCH). The packet-based data stream is usually bursty, that is, there is data transmission for a period of time, and then a subsequent long period of time witnesses no data transmission. The continuous listening to the PDCCH inevitably leads to fast power drain of the UE. Therefore, when there is no data transmission, the power consumption can be reduced by stopping receiving PDCCH (at this time, the blind detection of PDCCH will be stopped). As a result, the discontinuous reception (DRX) mechanism is used to achieve power saving. As shown in FIG. 1, in a DRX cycle, UE only monitors PDCCH in an On duration, while in "Opportunity for DRX", i.e., DRX off duration, UE does not receive PDCCH to reduce power consumption, i.e., the UE enters a sleep mode.

In order to quickly respond to scheduling performed by the base station, and reduce the UE latency, it is difficult to set the DRX off period to be a long time in the mobile communication system. As a result, the power saving effect is greatly impacted due to the frequent DRX on/off switching of the UE.

It is considered, in the research of narrowband Internet of Things (NB-IoT) power consumption, to add a mechanism of sending a wake up signal (WUS) to trigger detection of paging signals, as shown in FIG. 2. A dotted vertical line in FIG. 2 indicates a paging opportunity (PO). In the absence of the WUS, the UE in RRC_IDLE needs to wake up periodically to receive potential paging signals at each PO location. The UE needs to blindly detect the PDCCH of paging signal before each detection of the potential paging signal, and if the PDCCH of paging signal is detected, the UE continues to decode the paging signal, otherwise the UE does not decode the paging signal. Another method is to send the WUS before the paging signal. The UE starts detecting blindly the PDCCH of paging signal if the WUS is detected, and the UE gives up the detection of the paging signal at the PO if the WUS is not detected. Since the WUS can be designed as a sequence, the detection complexity thereof is much lower than the complexity of blind detection of PDCCH, so the use of WUS can reduce the reception power consumption significantly.

NR systems have three states of RRC_IDLE/RRC_Inactive/RRC_Active, and naturally, can borrow the above idea in NB-IoT. The base station sends the power saving signal in the Opportunity for DRX period. If UE detects the power saving signal before DRX on, the UE will monitor PDCCH in the subsequent DRX on period, otherwise the UE continues to sleep and does not detect PDCCH in the DRX on period.

Two power saving signals/channels are discussed regarding NR power saving.

Solution 1: the power saving signal is designed based on a sequence, for example, channel state information reference signal (CSI-RS) in NR related art or newly designed sequence-based power saving signals.

Solution 2: the power saving signal is designed based on PDCCH. This solution requires UE to wake up the RF and baseband demodulation and decoding module. Thus, the power consumption of the solution is higher compared with the solution of the sequence-based power saving signal, but is still significantly lower than the scenario in which PDCCH is detected in DRX on period when the power saving signal is absent. Moreover, the downlink control information (DCI) of the PDCCH-based power saving signal can have a larger capacity to transmit a large quantity of information bits, to support power saving in DRX on period and spectrum efficiency improvement.

The power saving signal described above is used to indicate whether to wake up the UE receiver to perform PDCCH monitoring in DRX on, and the power saving signal can be considered as a power saving signal with wake-up function. In addition to the wake-up function, the power saving signal-based PDCCH can also carry a variety of power saving information, such as information regarding the bandwidth part (BWP) that the UE needs to switch to, information regarding the Scell (serving cell) that needs to be activated; in order to reduce the complexity of blind detection of the PDCCH scheduling data, it is necessary to indicate, in the power saving signal, information regarding the blind detection of the control channel, such as a subset of the search space. Once the UE is woken, in order to facilitate the UE power saving, the power saving signal needs to instruct the UE to carry out the so-called sleep mode, that is, the mode in which the UE does not perform PDCCH monitoring. If the sleep mode time is long, the UE may enter a deep sleep mode, that is, the RF module and most of the baseband modules are turned off and only a few necessary modules are on, e.g., the clock is kept on. The UE may also enter a light sleep mode, that is, some of the radio frequency (RF) and base band modules may be turned off, and PDCCH monitoring is not performed. The UE may also enter a micro sleep mode that does not need to turn off the radio frequency and base band modules, but just does not receive data and does not detect PDCCH, which can quickly resume detection of PDCCH.

In related art, there are two common types of PDCCHs: UE specific PDCCH and group common PDCCH. For example, the UE specific PDCCH can be scrambled with cell radio network temporary identification (C-RNTI) to carry the control information of one UE, while the group common PDCCH is scrambled with the radio network temporary identification (RNTI) corresponding to a group ID to carry control information of more than one UE. For UE specific power saving information, if a group common format is used, the DCI size will be relatively large due to the possibility of carrying power saving information of multiple UEs, which will reduce the power saving signal performance. For example, for the cell edge or when beam direction is not very accurate, the performance of the power saving signal cannot be guaranteed. However, for hotspots where multiple UEs may need to be woken at the same time within a small area, it is desirable to use a group common PDCCH to transmit power saving signals. From the perspective of power saving information, the UE specific PDCCH can carry more power saving information to achieve better power saving, while the group common PDCCH cannot carry too much power saving information for each UE, and has inferior power saving performance.

Therefore, from the perspective of design requirements of power saving signals, it is necessary to design two formats, namely, UE specific PDCCH and group common PDCCH. However, the two formats of PDCCHs may bring the possibility that the UE needs to detect these two different formats of PDCCHs at the same time. Meanwhile, designing two types of DCIs requires additional standardization complexity in terms of DCI format design and its search space configuration.

SUMMARY

Embodiments of the present disclosure provide methods for transmitting and detecting a physical downlink control channel, a network device and UE. A DCI format can be implemented to support the transmission of UE specific power saving signals and group common power saving signals, so as to reduce configuration complexity.

To solve the above technical problem, embodiments of the present disclosure provide the following technical solutions:

A method for transmitting a physical downlink control channel, including:

transmitting a physical downlink control channel (PDCCH) to a UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

Optionally, the DCI supporting transmission of UE specific control information and group common control information includes at least one of power saving signal type indication information, power saving information configuration indication information, or a power saving information set.

Optionally, when a network device explicitly indicates power saving signal type indication information, the power saving signal type indication information is indicated by at least one bit, and the type indication information of the UE specific power saving signal and the type indication information of the group common power saving signal are indicated by different bits or different states of a same bit.

Optionally, when a network device implicitly indicates power saving signal type indication information, the DCI includes at least one of power saving information configuration indication information or a power saving information set.

Optionally, the network device implicitly indicates that the power saving signal type is a UE specific power saving signal by configuring a UE specific search space (USS) for UE via radio resource control (RRC) signaling; or the network device implicitly indicates that the power saving signal type is a group common power saving signal by configuring a common search space (CSS) for the UE via radio resource control (RRC) signaling.

Optionally, when a power saving signal type indicated by the power saving signal type indication information is the UE specific power saving signal, the power saving information configuration indication information is denoted by N bits, the N bits of power saving information configuration indication information including N1 power saving information configuration indications, the power saving information set including N2 power saving information fields, the N being greater than or equal to N1, the N1 being greater than or equal to N2.

Optionally, N1 is notified to the UE through static configuration, or, is notified explicitly or implicitly to the UE via high-layer signaling.

A corresponding relationship between the N1 power saving information configuration indications and the N2 power saving information fields is statically configured in a predetermined manner or is semi-statically configured via high-layer signaling.

Optionally, each power saving information configuration indication occupies at least 1 bit, each power saving information configuration indication corresponds to at least one power saving information field, and the power saving information field corresponding to each power saving information configuration indication is of a same length.

Optionally, first N2 power saving information configuration indications of the N1 power saving information configuration indications sequentially correspond to the N2 power saving information fields in a one-to-one manner when N1 is greater than N2.

Optionally, when a power saving signal type indicated by the power saving signal type indication information is the UE specific power saving signal, the DCI includes the power saving signal type indication information and power saving information configuration indication information; or, the DCI includes the power saving signal type indication information and the power saving information set.

Optionally, when a power saving signal type indicated by the power saving signal type indication information is the group common power saving signal, the power saving information configuration indication information is denoted by N bits and the N is greater than or equal to a quantity of UEs within a group, wherein there are M1 woken UEs within the group, and the power saving information set includes M2 power saving information fields; the M1 is less than or equal to the quantity of UEs in the group, and the power saving information fields are power saving information fields corresponding to the woken UEs.

Optionally, the power saving information configuration indication corresponding to each UE in the power saving information configuration indication information occupies at least one bit, and a quantity of bits occupied by the power saving information configuration indication corresponding to each UE is the same or not the same; or at least one UE corresponds to one bit of power saving information configuration indication in the power saving information configuration indication information.

Optionally, each UE is notified, semi-statically via high-layer signaling, or through a predetermined static configuration, of a position of the UE's corresponding configuration information in the power saving information configuration indication information.

Optionally, in case that one bit of the at least one bit occupied by the power saving information configuration indication corresponding to each UE is activated, the UE is a woken UE.

Optionally, each woken UE corresponds to at least one power saving information field and the at least one power saving information field corresponding to the woken UE has the same length when the power saving information configuration indication corresponding to each UE occupies one bit.

Optionally, first M2 UEs of the M1 UEs sequentially correspond to the M2 power saving information fields in a one-to-one manner when M1 is larger than M2 and one UE corresponds to one power saving information field.

Optionally, the power saving information field corresponding to each UE carries at least one bit of wake-up or sleep indication information; or, a UE of the M1 UEs that does not have a corresponding power saving information field is activated on a currently activated bandwidth part (BWP).

Optionally, when the quantity of bits occupied by the power saving information configuration indication corresponding to each UE is not the same, each woken UE corresponds to at least one power saving information field, and an i-th power saving information field of each UE has a same length, i being greater than or equal to 1 and less than or equal to K, K being a quantity of power saving information fields corresponding to the UE.

Optionally, the power saving information configuration indication corresponding to the woken UE occupies Z bits, the quantity of power saving information fields corresponding to the woken UE is K, and when Z is less than K, the power saving information corresponding to the woken UE is first Z power saving information fields of the K power saving information fields.

Optionally, one power saving information field includes at least one kind of power saving information field of all woken UEs in the group.

Optionally, the power saving information configuration indication information includes power saving information configuration indication for W consecutive discontinuous reception (DRX) cycles, W being greater than or equal to 1, and the power saving information set includes V groups of power saving information corresponding to the power saving information configuration indication, V being greater than or equal to 1 and less than or equal to W.

Optionally, the group common power saving signal is transmitted in a common search space (CSS), and if the power saving information field of a woken UE is not transmitted, remaining power saving information field of the woken UE is transmitted in a UE specific search space (USS); or the power saving signal is transmitted in the USS only; or the group common power saving signal is transmitted in the CSS and the UE specific power saving signal is transmitted in the USS.

Optionally, the demodulation reference signal (DMRS) corresponding to the power saving signal is scrambled by using the power saving signal-radio network temporary identification (PS-RNTI).

An embodiment of the present disclosure also provides a method for detecting a physical downlink control channel, including:

detecting the physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal;

detecting the UE specific power saving signal and the group common power saving signal according to the DCI.

An embodiment of the present disclosure also provides an apparatus for transmitting a physical downlink control channel, including:

a transceiver module, configured to transmit the physical downlink control channel (PDCCH) to UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

Optionally, the DCI supporting transmission of UE specific control information and group common control information includes at least one of power saving signal type indication information, power saving information configuration indication information, or a power saving information set.

An embodiment of the present disclosure also provides a network device, including: a processor and a storage storing therein a program executable by the processor, and the processor is configured to execute the program to implement: transmitting a physical downlink control channel (PDCCH) to UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

An embodiment of the present disclosure also provides an apparatus for detecting a physical downlink control channel, including:

a transceiver module, configured to detect the physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal;

a processing module, configured to detect the UE specific power saving signal or the group-public power saving signal according to the DCI.

An embodiment of the present disclosure also provides UE, including: a processor and a storage storing therein a program executable by the processor, and the processor is configured to execute the program to implement: detecting a physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal; detecting the UE specific power saving signal or the group common power saving signal according to the DCI.

An embodiment of the present disclosure also provides a computer storage medium, storing therein an instruction, wherein the instruction is configured to be executed by a computer, to implement the above-mentioned methods.

The beneficial effect of the embodiments of the present disclosure is as following.

In the above-mentioned embodiments of the present disclosure, downlink control information (DCI) is sent to UE, the DCI supporting transmission of the UE specific power saving signals and the group common power saving signals. This enables a DCI format that supports the transmission of the UE specific power saving signals and the group common power saving signals, which reduces configuration complexity.

BRIEF DESCRIPTION OF THE DRAWINGS

FIG. 1 is a schematic diagram of a discontinuous reception (DRX) cycle;

FIG. 2 is a schematic diagram of an operating mechanism of a wake-up signal;

FIG. 3 is a schematic flowchart of a method for transmitting a physical downlink control channel according to an embodiment of the present disclosure;

FIG. 4 is a schematic structural diagram of a power saving signal according to an embodiment of the present disclosure;

DETAILED DESCRIPTION

Figure 5:
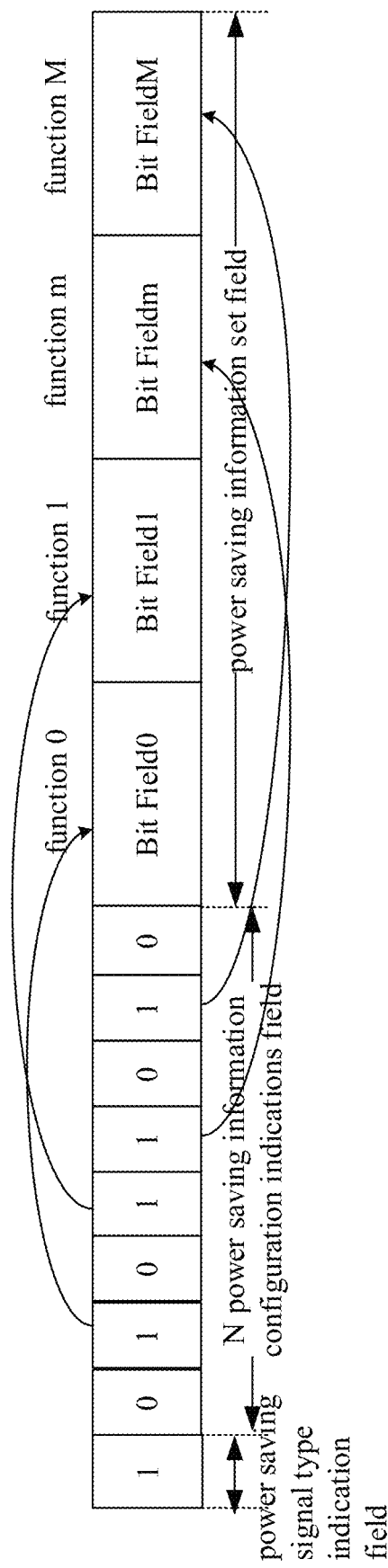
FIG. 5 is a schematic structural diagram of a UE specific power saving signal according to an embodiment of the present disclosure.

Exemplary embodiments of the present disclosure will be described in greater detail below with reference to the accompanying drawings. While exemplary embodiments of the present disclosure are shown in the accompanying drawings, it should be understood that the present disclosure can be implemented in various forms and should not be limited by the embodiments set forth herein. Rather, these embodiments are provided to enable a more thorough understanding of the present disclosure and to enable the complete scope of the present disclosure to be conveyed to those skilled in the art.

As shown in FIG. 3, an embodiment of the present disclosure provides a method for transmitting a physical downlink control channel, including: step 31, transmitting a physical downlink control channel (PDCCH) to a UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal. The control information herein may also be, for example, scheduling control information, and the embodiment of the present disclosure enables the DCI of one format to support the transmission of at least two types of control information at the same time, which facilitates the design of the DCI and reduces overhead.

In an optional embodiment of the present disclosure, as shown in FIG. 4, which is a schematic structural diagram of the power saving signal, both the UE specific power saving signal and the group common power saving signal include at least one of: power saving signal type indication information, power saving information configuration indication information, or power saving information set.

Optionally, the DCI herein may include at least two of: power saving signal type indication information, power saving information configuration indication information, or power saving information set. For example, the DCI includes power saving signal type indication information and power saving information configuration indication information, or, the DCI includes power saving signal type indication information and power saving information set, or, the DCI includes power saving information configuration indication information, and power saving information set, etc.

When a network device explicitly indicates power saving signal type indication information, the power saving signal type indication information includes at least one bit, and the types, namely, UE specific power saving signal and group common power saving signal, are indicated by different bits or different states of a same bit. For example, the UE specific power saving signal is indicated by a bit of 1 and the group common power saving signal is indicated by a bit of 0; or it may be that the UE specific power saving signal is indicated by a bit of 0 and the group common power saving signal is indicated by a bit of 1.

When a network device implicitly indicates power saving signal type indication information, the DCI includes at least one of power saving information configuration indication information or a power saving information set.

Optionally, the network device implicitly indicates that the power saving signal type is UE specific power saving signal by configuring a UE specific search space (USS) for a UE via radio resource control (RRC) signaling; or, the network device implicitly indicates that the power saving signal type is group common power saving signal by configuring a common search space (CSS) for a UE via radio resource control (RRC) signaling.

For example, when the position, within the power saving information configuration indication information (bitmap), of the power saving information configuration indication corresponding to the UE is configured by RRC signaling, it can be determined that the DCI indicates a group common power saving signal; if it is found that the position, within the power saving information configuration indication information (bitmap), of the power saving information configuration indication corresponding to the UE is not configured by RRC signaling, it can be determined that the DCI indicates a UE specific power saving signal.

For another example, a size of the DCI is configured by RRC signaling, and it can be determined, based on the size of the DCI, whether the DCI indicates a UE specific power saving signal or a group common power saving signal; in an optional implementation, the size of the DCI and a size of the power saving information configuration indication information (bitmap) are configured by RRC signaling, wherein, for example, the DCI includes 12 bits and the bitmap includes 8 bits. The base station transmits the power saving information of the UE on the 8 bits of the bitmap and first 4 bits of the power saving information fields, and after the UE decodes the power saving information and identifies that the type of power saving signal is UE specific power saving signal, the UE directly parses the power saving information of the UE according to the corresponding bits after the power saving signal type indication.

In an optional embodiment of the present disclosure, when a power saving signal type indicated by the power saving signal type indication information is UE specific power saving signal, as shown in FIG. 5, the power saving information configuration indication information includes N bits. The N bits of power saving information configuration indication information include N1 bits of power saving information configuration indication, the power saving information set includes N2 power saving information fields, wherein N is greater than or equal to N1, and N1 is greater than or equal to N2.

The N1 bits of power saving information configuration indication includes at least one of: cross slot scheduling indication information; aperiodic CSI-RS (channel state information reference signal) triggering, reporting information; BWP (bandwidth part) information; serving cell activation/deactivation (SCell activation/deactivation) information; physical downlink control channel skipping (PDCCH skipping) information.

For UE specific power saving signals, the power saving information configuration indication information can be represented by a bitmap. The bitmap indicates the power saving information configuration indications that the network device (e.g., base station) configures for the UE. Here, the bitmap can include N bits, and the network device configures N1 bits of power saving information configuration indication for the UE, e.g., N1=4, which means 4 power saving information configurations are configured for the UE and corresponding bits are 1.

For example, assuming that the power saving information configuration indication may include five power saving information sets: x1 bits of cross-slot scheduling indication information, x2 bits of aperiodic CSI-RS triggering and reporting information, x3 bits of BWP information, x4 bits of serving cell activation/de-activation information, and x5 bits of PDCCH skipping information.

Accordingly, the power saving information sets include N2 power saving information fields corresponding to the above-mentioned power saving information configurations respectively, where N2 may be 4, namely, BitField0, BitField1, BitFieldm and BitFieldM.

However, the power saving information fields actually configured by the base station vary with the transmission environment, for example, the power saving information fields actually configured can be 2 of them (e.g., BitField0 and BitField1) or 1 of them (e.g., BitField0), thus the bitmap is used to indicate the power saving information fields configured by the base station; and the power saving information fields include the power saving information sets corresponding to the bitmap.

FIG. 5 shows a specific example of one UE specific power saving signal. The first part of the UE specific power saving signal, namely, the power saving signal type indication information, is one bit set to 1 to indicate that the current power saving signal is a UE specific power saving signal; the second part is a bitmap including N bits; if N1 bits in the bitmap are 1, the third part, namely, the power saving information fields, includes N2 BitFields configured by the base station for the UE, where N1=N2. Of course, N2 can also be different from N1. Optionally, one bit of the bitmap corresponds to one bit field. One bit of the bitmap can also correspond to multiple bit fields according to a preset rule, so that there is less bitmap overhead.

In this embodiment, the network device notifies the UE of the N1 through a static configuration, or explicitly or implicitly notifies the UE of the N1 via high-layer signaling. The N2 can also be notified to the UE implicitly via high-layer signaling.

In this embodiment, the corresponding relationship between the N1-bit power saving information configuration indication and the N2 power saving information fields is statically configured through a predetermined manner or semi-statically configured through high-layer signaling.

In order to assist the UE in parsing the power saving signal, the base station needs to notify the UE of the quantity of bits (N) occupied by the bitmap field through a predetermined static configuration, or notify explicitly or implicitly, via the high-layer signaling (such as RRC signaling), the UE of the quantity of bits (N) occupied by the bitmap field. The quantity, namely N2, of power saving information fields included in the third part (i.e., the power saving information set) is optionally indicated in an implicit manner. For example, the base station semi-statically sets the size of the DCI corresponding to the power saving signal through RRC signaling, and the UE can calculate the size of the power saving information fields according to the size of the bitmap and the size of the power saving signal type indication information, and then the approximate value of N2 can be calculated according to the size of each power saving field. In fact, the UE just needs to determine the total quantity of bits occupied by the power saving information fields.

It should be further pointed out that as long as there is the bitmap and the power saving information set, the above description is applicable. The corresponding relationship between the N1 power saving information configuration indications and the N2 power saving information fields is configured statically through a predetermined manner or semi-statically configured through high-layer signaling. The corresponding relationship between the bits of the bitmap and the power saving information fields carried in the third part may be semi-statically configured by the base station through RRC signaling, or may be statically configured by the base station for the UE through a predetermined manner, for example, a sequential indication according to a position in the bitmap, as shown in FIG. 5.

In an optional embodiment of the present disclosure, each power saving information configuration indication occupies at least 1 bit, each power saving information configuration indication corresponds to at least one power saving information field, and the power saving information field corresponding to each power saving information configuration indication has the same length.

In an optional embodiment of the present disclosure, when N1 is greater than N2, first N2 power saving information configuration indications of the N1 power saving information configuration indications sequentially correspond, in a one-to-one manner, to the N2 power saving information fields.

For the UE specific power saving signal, the base station notifies the UE that the power saving signal is a UE specific power saving signal through the power saving signal type indication part, and the base station directly transmits the power saving information of the UE sequentially on the consecutive bits after the power saving signal type indication, i.e. on the second part and the third part, namely, the positions corresponding to bitmap+power saving information fields. That is, when a power saving signal type indicated by the power saving signal type indication information is UE specific power saving signal, the DCI includes the power saving signal type indication information and the power saving information configuration indication information; or, the DCI includes the power saving signal type indication information and the power saving information set.

For example, the base station configures the bitmap size to be 8 bits, and the power saving information size is 12 bits, then the base station transmits the power saving information of the UE on the 8 bits of the bitmap and first 4 bits of the power saving information fields, and after the UE decodes the power saving information and identifies that the type of power saving signal is UE specific power saving signal, the UE directly parses the power saving information of the UE according to the corresponding bits after the power saving signal type indication.

In the above-mentioned embodiment, optionally, the power saving information is on a plurality of consecutive preset bits after the power saving signal type indication, and it is not ruled out that the power saving information is mapped to some pre-defined bit sets after the power saving signal type indication. This method is more suitable for scenarios where the quantity of bits of the power saving information of the UE is small.

Figure 6:
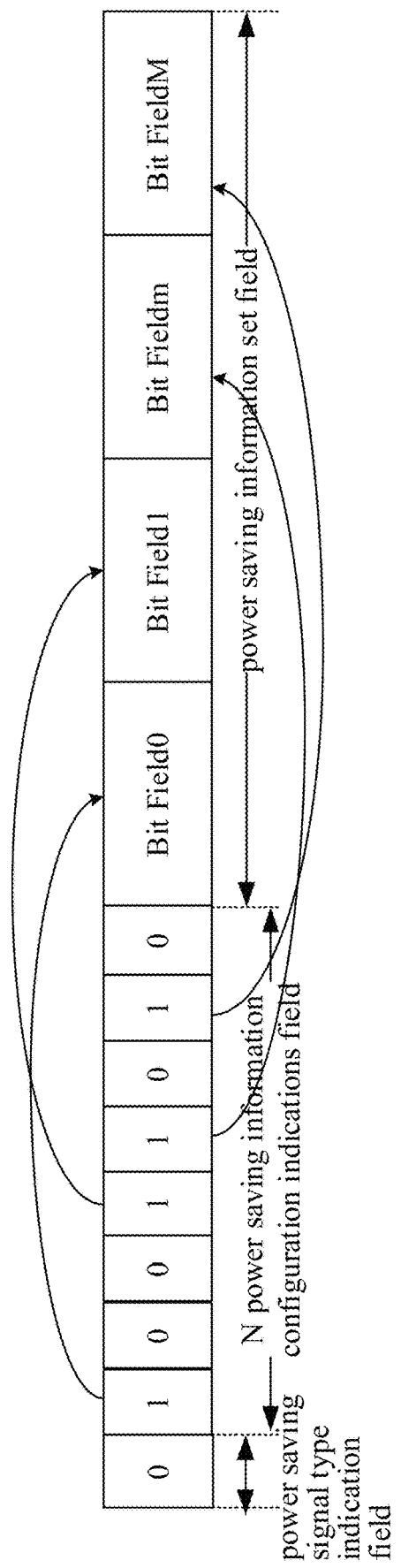
FIG. 6 is a schematic structural diagram of a group common power saving signal according to an embodiment of the present disclosure.

In another optional embodiment of the present disclosure, as shown in FIG. 6, when the power saving signal type indicated by the power saving signal type indication information is group common power saving signal, the power saving information configuration indication information includes N bits, and the N is greater than or equal to the quantity of UEs in the group, wherein, there are M1 woken UEs in the group, and the power saving information set includes M2 power saving information fields; wherein, there are M1 woken UEs, and the M1 is less than or equal to the quantity of UEs in the group, and the power saving information fields are the power saving information fields corresponding to the woken UEs.

For the group common power saving signal, the base station uses, for example, a bit 0 in the power saving signal type indication information to indicate the group common power saving signal. The second part, namely, the power saving information configuration indication information, is a bitmap including N bits, wherein M1 bits with a value of 1 are used to identify the UEs that will be woken. The third part, namely, the power saving information set, includes M2 bit fields, which are the power saving information of different woken UEs respectively.

Here, in the power saving information configuration indication information, the power saving information configuration indication corresponding to each UE occupies at least one bit, and the power saving information configuration indication corresponding to each UE occupies the same or unequal number of bits; or, in the power saving information configuration indication information, a one-bit indication corresponds to at least one UE.

Each UE may be notified, semi-statically via high-layer signaling or according to a predetermined static configuration, of the position of its corresponding configuration information in the power saving information configuration indication information.

The power saving information configuration indication corresponding to each UE occupies at least one bit, and if one bit is activated, the UE is a woken UE, and the power saving information configuration indication corresponding to each UE occupies the same or unequal number of bits.

That is to say, one UE in the group can correspond to one bit or multiple bits. The base station can instruct, through the bitmap, the corresponding UE to perform wake-up or sleep operation. If the UE is woken, the UE will perform the PDCCH monitoring in the subsequent active period, otherwise the UE will not perform PDCCH monitoring during the subsequent active period, that is, perform sleep operation.

Regarding the bit in the bitmap that is allocated for each UE in the group, the base station can configure, by using RRC signaling or in a predetermined manner, corresponding power saving information field, such as the specific content and the quantity of bits of the power saving information included in the power saving information field.

In an optional embodiment of the present disclosure, when the power saving information configuration indication corresponding to each UE occupies 1 bit, each woken UE corresponds to at least one power saving information field, and the at least one power saving information field corresponding to the woken UE has the same length.

Here, when M1 is greater than M2, and one UE corresponds to one power saving information field, first M2 UEs of the M1 UEs sequentially correspond to M2 power saving information fields in a one-to-one order.

The quantity of bits (N) of the power saving information configuration indication information is greater than or equal to the quantity of UEs in the group. When the value of N is equal to the quantity of UEs in the group, each bit of the bitmap corresponds to one UE. For example, if a bit corresponding to a UE is equal to 1, the power saving information corresponding to the UE is carried in the subsequent third part: the power saving information field. For example, as shown in FIG. 5, the M2 power saving information fields in the third part correspond, in a one-to-one manner, to M1 to-be-woken UEs indicated by the bitmap in the second part. The power saving information field corresponding to each UE carries at least one bit of wake-up or sleep indication information; or, on the currently activated bandwidth part (BWP), a UE in the M1 UEs that does not have the corresponding power saving information field is activated.

Figure 7:
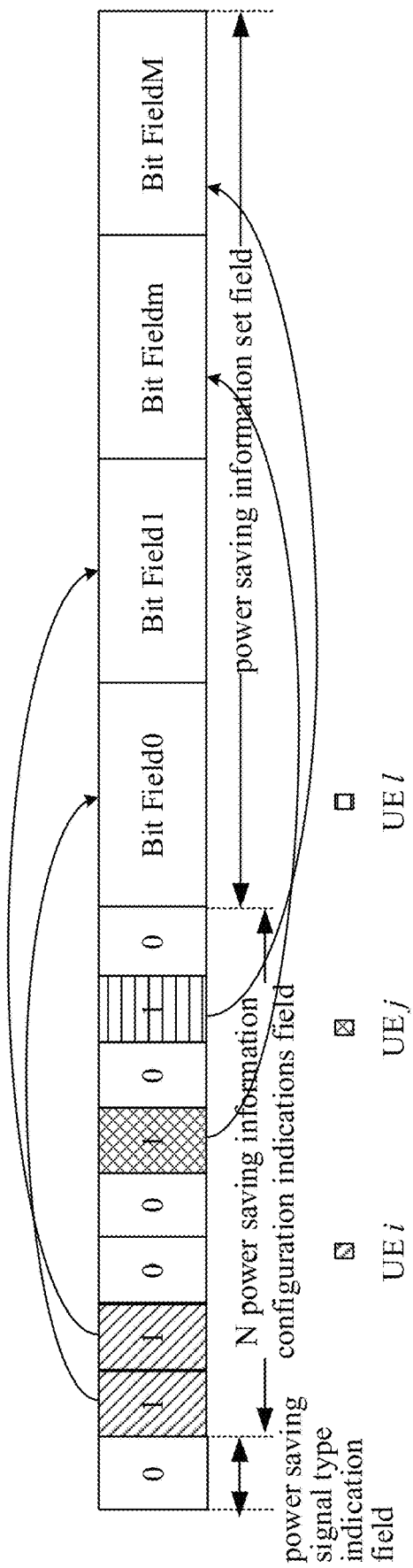
FIG. 7 is another schematic structural diagram of a group common power saving signal according to an embodiment of the present disclosure.

As shown in FIG. 6, the power saving information configuration indication corresponding to the woken UE occupies M11 bits, where M11 is 1, of course, M11 can also be greater than 1; as shown in FIG. 7, the position indication of a UE (UEi) can occupy 2 bits; in an optional implementation, the quantity of bits occupied by the position indication of each UE may be the same or different.

The M2 power saving information fields in the third part sequentially correspond, in a one-to-one manner, to first M1 to-be-woken UEs indicated by the bitmap in the second part. The power saving information corresponding to each woken UE occupies M21 bits, namely Bit Field0, Bit Field1, Bit Fieldm or Bit FieldM may be M21 bits. In an optional implementation, the size of Bit Field0, Bit Field1, Bit Fieldm or Bit FieldM may be equal or unequal.

In an optional implementation manner, each bit of the M11 bits corresponds to one power saving information, and the power saving information corresponding to each bit occupies at least one bit.

As shown in FIG. 6, each UE in the group corresponds to one bit of the bitmap, because the woken UE needs to address the corresponding power saving information field according to indication of the bitmap, if the size of the power saving information field corresponding to each UE in the group is not equal, the base station needs to notify each UE in advance of the sizes of the power saving fields corresponding to the UE and other UEs in the group.

In addition, the base station can configure a set of bits composed of multiple bits in the bitmap for a single UE through high-layer signaling, such as RRC signaling, and configure a power saving information field corresponding to each power saving information configuration in the power saving information configuration indication information through high-layer signaling (such as RRC signaling) or in a predetermined manner, such as the specific content and the quantity of bits of the power saving information included in the power saving information field.

The UE first detects the power saving signal; after identifying the power saving signal as a group common power saving signal, the UE identifies a position in the bitmap that corresponds to the UE, and as long as one of the corresponding bits is activated, for example, set to 1, the UE wakes up its receiving module; The UE parses the corresponding power saving information according to the bitmap indication.

Two specific methods are given below to support the configuration of power saving information of different sizes for the UEs in the group.

In one implementation, the length of each power saving information field is the same, that is, the field length of Bit Field0, Bit Field1, Bit Fieldm, or Bit FieldM is the same. The base station can configure, through high-layer signaling (such as RRC signaling), the position within the bitmap that corresponds to the UE in the group. Through the position indication, the UE can be aware of the quantity of bits occupied by the UE in the bitmap, and the quantity of bits can be greater than 1.

As shown in FIG. 7, UEi corresponds to 2 bits in the bitmap, which correspond to 2 subsequent power saving information fields respectively, while UEj corresponds to one bit in the bitmap, which corresponds to one power saving information field in the third part; likewise, UE1 corresponds to one bit in the bitmap, which corresponds to one power saving information field in the third part.

In this way, it is supported that different UEs can have different respective lengths of power saving information, without the need for the base station to notify UE of the size of power saving information field corresponding to other UEs. Sometimes, the base station configures multiple power saving information fields for each UE through RRC signaling, but in practice, it may only be necessary to configure some of the power saving information fields for the UE.

Figure 8:
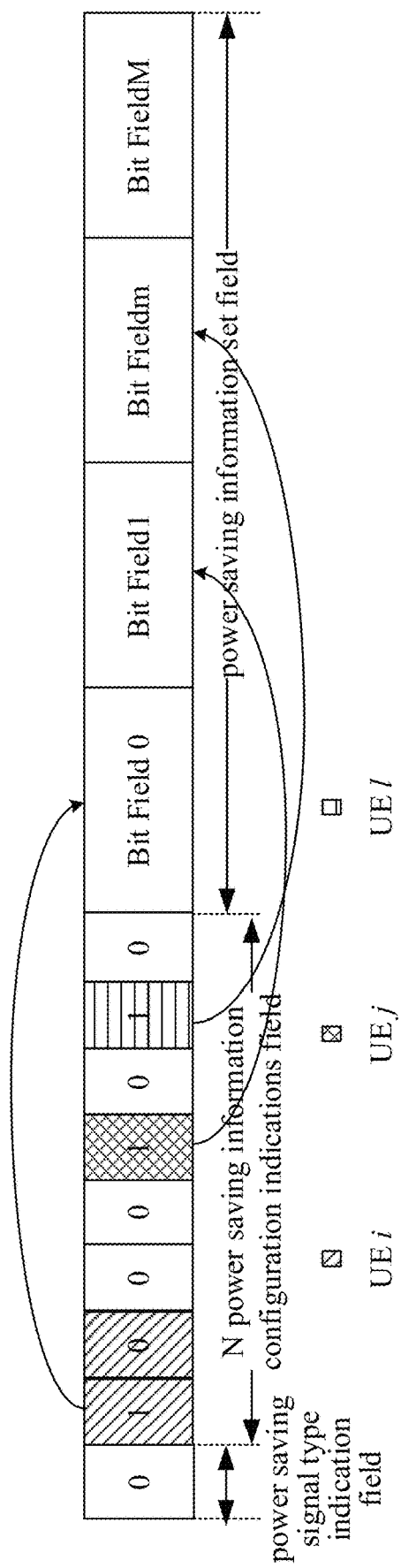
FIG. 8 is yet another schematic structural diagram of a group common power saving signal according to an embodiment of the present disclosure.

As shown in FIG. 8, RRC signaling configures that UEi corresponds to two bits in the bitmap, the base station configures only one of the bits as 1 in the power saving signal, then UEi is woken, and only the power saving information field in the third part that corresponds to 1 in the bitmap is configured.

In the examples given in FIG. 7 and FIG. 8, each UE can be configured with one position or multiple positions in the bitmap. At this time, optionally, the size of each corresponding power saving information field is the same.

In an optional embodiment of the present disclosure, the power saving information field corresponding to each UE carries at least one bit of wake-up or sleep indication information; or on the currently activated bandwidth part (BWP), the UE in the M1 UEs that does not have corresponding power saving information field is activated.

When the quantity of bits occupied by the power saving information configuration indication corresponding to each UE is not equal, each woken UE corresponds to at least one power saving information field, and the length of the i-th power saving information field of each UE is the same. The i is greater than or equal to 1, and less than or equal to K, K is the quantity of power saving information fields corresponding to the UE.

If the quantity of bits occupied by the power saving information field corresponding to each woken UE is different, the quantity of bits occupied by the power saving information corresponding to the UE is informed to the UE.

For example, the base station configures, semi-statically through RRC signaling or in a predetermined static manner, the power saving information field (that is, the third part) for each UE. For example, the base station can divide, semi-statically through RRC signaling or in a predetermined static manner, the power saving information of each UE into two power saving information fields. For example, one of the fields includes Scells activation/deactivation related information, and this field may also include other information such as reserved bits, and the other field includes power saving information such as cross slot scheduling, aperiodic CSI-RS, but does not include Scells activation/deactivation related information. Since Scells activation/deactivation requires more information bits, the base station can determine, based on channel conditions or the quantity of UEs in the group, whether Scells activation/deactivation information is not configured for all UEs or some UEs.

In this case, the base station can configure two positions in the bitmap for each UE through RRC signaling. Each of the two positions corresponds to one power saving information field. The size of the power saving information field can be the same or different. Optionally, the size of each of the two power saving information fields is configured to be the same for all UEs, that is, the size of the first field is the same for all UEs in the group, and the size of the second field is the same for all UEs in the group. If a corresponding position in the bitmap is configured as 1, the field is included, and if a corresponding position in the bitmap is configured as 0, the field is not included.

The power saving information including two power saving information fields described above is merely provided for ease of description. A more general situation is: the base station configures, semi-statically through RRC signaling or in a predetermined static manner, up to K power saving information fields for each UE in the group (it is possible that the quantity of power saving fields configured for certain UE is less than K), but the size of the i-th ($1=<i<=K$) power saving information field is the same for all UEs. The base station notifies the UE of the sizes of all K power saving information fields in a predetermined or explicit/implicit manner (optionally, each UE in the group is configured with the same quantity of power saving fields, and the size of each field is the same for all UEs as described above. If the quantity of the power saving fields configured for certain UE is actually less than K, the base station needs to notify the UE of the sizes of all possible power saving fields). The base station notifies the UE of the position in the bitmap through RRC signaling. If the corresponding position in the bitmap is 1, then the power saving information field is carried. If the corresponding position is 0, then the power saving information field is not carried.

In an optional embodiment of the present disclosure, the power saving information configuration indication corresponding to the woken UE occupies Z bits, and the quantity of power saving information fields corresponding to the woken UE is K. When Z is less than K, the power saving information corresponding to the woken UE is the first Z fields of the K power saving information fields. One power saving information field includes at least one kind of power saving information field of all woken UEs in the group.

For example, the quantity of bitmap positions occupied by each UE, notified by RRC signaling, can be the same or different (if different, for example, a UE is configured with 3<K power saving information fields, these three power saving information fields must be the first 3 power saving fields in at most K power saving information fields). The UE parses the power saving information field according to the indication of position in the bitmap. Since the UE knows the respective sizes of the K power saving fields, it is easy for the UE to parse the power saving information configured by the base station for the UE. It should be pointed out that in this method, the size of each power saving information field can be different.

In this method, if the base station configures at most K power saving fields for each UE in the group, and Z<K positions are configured in the bitmap, the corresponding Z power saving information fields must be the first Z of the K power saving information fields, since only in this way can the UE parse the power saving information correctly. Here, when the sizes of the power saving information fields are different, the quantity of the power saving information fields is fixed, and respective UEs are configured with the same or different quantities of positions in the bitmap, a trade-off between flexibility and signaling overhead is achieved. Taking two power saving information fields as an example, if only the first power saving information field is configured, then only one position in the bitmap may be configured for the UE; but if only the second power saving information field is configured, then two positions in the bitmap need to be configured for the UE, wherein the bit at the first position is set to 0 and the bit at the second position is set to 1.

In the embodiment of the present disclosure, when the quantity of power saving information fields (M2) is significantly smaller than the quantity of UEs in the group (M1), although the bitmap method can make the DCI information bits more compressed, more users cannot be woken due to the small quantity of power saving information fields when the quantity of UEs is relatively large. In order to instruct the UE to save energy, the power saving information corresponding to each UE needs to carry at least one bit of wake-up or sleep indication information. Therefore, a better method is to include, in the bitmap, WUS (wake up)/GTS (go to sleep) indication information for all UEs in the group. More specific, a N-bit bitmap is used to indicate that which UEs in the group need to be woken, thus the following power saving information field does not need to include the WUS/GTS indication bits.

Figure 9:
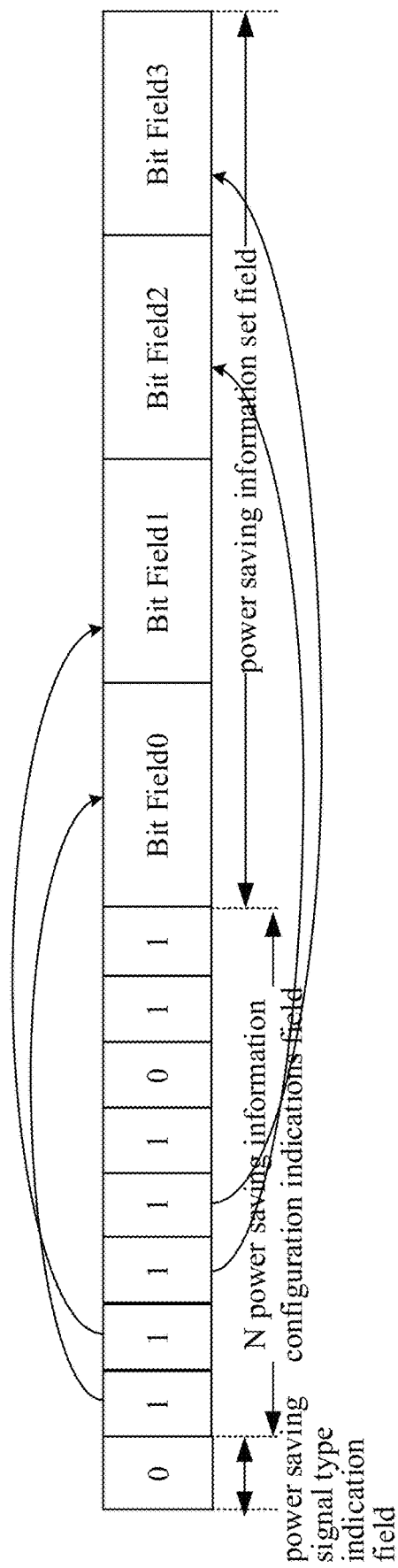
FIG. 9 is a schematic structural diagram of power saving information fields corresponding to UEs to be woken according to an embodiment of the present disclosure.

If the quantity of power saving information fields corresponding to UEs that need to be woken is greater than the quantity of power saving information fields that can be supported (M2), for example, as shown in FIG. 9, there are multiple woken UEs that do not have corresponding power saving information in the subsequent power saving information fields, then the UE needs to perform operations according to preset rules after the wake-up. For example, the UE works on the currently activated BWP and carrier by default, and the UE can also consider by default that the base station activates aperiodic-CSI-RS/aperiodic-TRS/aperiodic-CSI-RS sending and reporting, and perform CSI-RS/SRS detection operations at corresponding locations; or, these UEs that do not have corresponding power saving information in the power saving information field is merely woken on the currently activated BWP and perform PDCCH detection operations.

In the above-mentioned embodiments of the present disclosure, optionally, each power saving information field belongs to one UE, or some UEs in the group share one or several power saving fields, such as in the situation where the quantity of bits (N) in the bitmap is less than the total quantity of UEs in the group, or, in the situation where the quantity of power saving information fields (M2) is less than the quantity of the UEs that need to be woken, but at this time, the base station needs to notify UEs, by signaling, of the mapping between UE power saving information fields and UEs.

In addition, one power saving information field includes at least one kind of power saving information of all woken UEs in the group. For example, the first power saving information field includes the cross slot scheduling information of all woken UEs in the group, e.g., each UE corresponds to a one-bit cross slot scheduling indication, and the specific position of the UE's power saving information in the power saving field is determined by the preceding bitmap; the second power saving information field contains the aperiodic-CSI/TRS/SRS trigger information corresponding to the woken UEs in the group; the third power saving information field contains the PDCCH skipping information corresponding to the woken UEs in the group, and the fourth power saving information field contains the SCells activation/de-activation information corresponding to the woken UEs in the group.

Subject to the DCI size limit, the last one or several fields may only include the power saving information of some UEs. This will cause that some of the power saving information of some UEs in the group cannot be carried in extreme cases. However, it is still an improvement compared with the previous method which may lead to situations where no other power saving information than bitmaps can be carried for certain UEs.

In this case, the bitmap field may be considered to have the GTS (Go to sleep)/WUS (Wake up signal) information indication field of all the UEs, that is, the bitmap part can be regarded as a special case of the third part (the power saving information field).

Optionally, regardless of the method for representing the power saving information field, the bitmap part is the WUS/GTS indication information of each UE in the power saving information, and this information will not be included in the subsequent power saving fields.

On the other hand, the base station can also configure multiple UEs to correspond to one bit in the bitmap, so that multiple UEs will be woken up or instructed to sleep at the same time and will also correspond to the same power saving information field, which can significantly reduce the DCI overhead. It should be pointed out that the method of the present disclosure is also applicable when there is no power saving signal type indication of the first part.

In an optional embodiment of the present disclosure, when M1=1, the DCI includes: the power saving signal type indication information and power saving information set; or, when the power saving signal type is indicated by the network device through the UE specific search space (USS) or the common search space (CSS) or the size of the DCI, the DCI includes: power saving information configuration indication information and power saving information set; or, the DCI includes: the power saving information field, wherein both the power saving signal type indication information and the power saving information configuration indication information are 0 bits, and the power saving information field includes power saving information of the UE.

Specifically, in the first specific implementation of the above-mentioned embodiment of the present disclosure: the UE specific power saving signal first uses a one-bit power saving signal type indication, and then uses a bitmap to indicate the supported specific power saving information configuration. This method has good flexibility, low DCI overhead and better detection performance;

In addition, the UE specific power saving signal can also be a special case of the group common power saving signal. In DCI, there is no one-bit power saving signal type indication information, and there is no bitmap field. The base station can configure the quantity of the UEs that need to support for the UE explicitly or implicitly, for example, the base station explicitly configures the quantity of the UEs corresponding to the power saving signal through RRC signaling, or implicitly indicates the quantity of UEs by defining the DCI size. For example, a special value such as DCI size=−1 may be defined to indicate a UE specific power saving signal, since the DCI using Polar encoding in NR has a minimum of 12 bits, the special value is optionally less than 12.

As for the UE specific power saving signal, the base station may also configure UE, through RRC signaling, to detect the PDCCH based power saving signal in USS (UE specific search space). When UE detects a power saving signal in USS, the UE may determine the power saving signal is a UE specific power saving signal (of course, if the RRC signaling configures the UE to detect the power saving signal in the CSS, the transmission and detection of the power saving signal are performed according to the group common power saving signal). For the UE specific power saving signal, the UE can perform channel decoding according to the size of the UE specific power saving signal. The power saving signal can be parsed according to the contents of the UE specific power saving signal.

In the second specific implementation of the above-mentioned embodiment of the present disclosure:

The group common power saving signal may reuse the format of the group common PDCCH, that is, multiple UEs have fixed DCI bits, DCI bits of multiple UEs are concatenated to form power saving signal DCI. Even if the base station does not wake up certain UEs, the DCI should include all-zero DCI bits corresponding to the UEs. This method has high DCI overhead, especially when there are many UEs in the group and there are few UEs to wake up; but the standardization complexity is low, and it is convenient to support power saving information of different sizes for respective UEs.

In this implementation, the base station notifies the UE of the corresponding UE specific power saving signal and/or group common power saving signal in a predetermined static configuration manner or a semi-static configuration manner through high-layer RRC signaling; the base station notifies the UE of the power saving signal type through explicit or implicit signaling (such as notifying the UE of the quantity of UEs, or determining according to the special size of the DCI that it is the UE specific power saving signal, or determining the power saving signal type by notifying the UE whether the power saving signal is detected in the USS or CSS). For the UE specific power saving signal, the UE decodes and parses the specific content according to the predetermined DCI length of the UE specific signal, while for the group common power saving signal, the UE parses according to the group common power saving signal.

Figure 10:
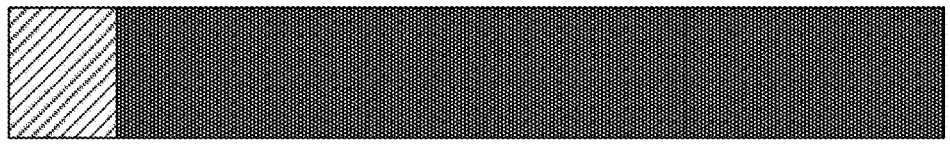
FIG. 10 is a schematic structural diagram of a power saving signal according to an embodiment of the present disclosure.

In the third specific implementation of the above-mentioned embodiment of the present disclosure: in the above-mentioned second specific implementation, if the base station explicitly or implicitly indicates that the quantity of UEs is greater than 1, for example, when DCI size=40, it is the format of the group common power saving signal, or CSS is configured for UE for power saving signal detection. In practice, when only one UE is to be woken, the power saving signal cannot be interpreted according to the UE specific power saving signal, because in general, the UE specific power saving signal can support more power saving information bits, such as 12-bit power saving information, while since the group common power saving signal supports multiple users at the same time, the power saving information supported is often less than the UE specific power saving signal, for example, 4 bits of power saving information for one user. Therefore, a trade-off between standardization complexity and flexibility is: the base station notifies, in a predetermined static configuration manner or a semi-static configuration manner through high-layer RRC signaling, the UE of the corresponding UE specific power saving information and/or the power saving information of the UEs in the group. The power saving signal sent by the base station includes two parts, namely, the power saving signal type indication part and the power saving information part, wherein similar to the above-mentioned first implementation, the power saving signal indication can be composed of 1 bit, to distinguish whether it is a UE specific power saving signal or a group common power saving signal, and the second part is the power saving information field part. As shown in FIG. 10, when the power saving signal type indication information is set to, e.g., bit 1, it can be used to indicate the UE specific power saving signal, the base station carries the UE specific information in the subsequent power saving information part, such as 12-bit power saving information; after parsing the power saving information type indication, the UE interprets the power saving signal according to the UE specific power saving information. If the power saving signal type indication identifies the power saving information as a group common power saving signal, the UE interprets the power saving signal according to the group common power saving information. The composition method of the group common power saving signal is the same as the second implementation above. Compared with the above-mentioned first implementation, this method cannot further reduce the DCI overhead because there is no bitmap indication. If there are other methods to determine the type of power saving signal, such as at least the several methods described in the second implementation above, for example, a UE specific power saving signal can be determined according to the DCI length, in order to prevent the one-bit power saving signal type indication from becoming redundant bit, when the UE decodes, the 1-bit power saving signal type indication can be used as a known frozen bit to assist the decoding, so that the bit can be further placed in the forefront or the most reliable position, the base station and UE are transparent to the frozen bit position.

Figure 11:
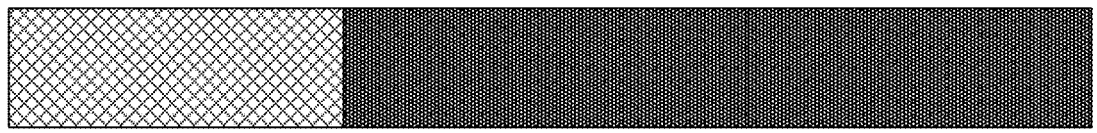
FIG. 11 is another schematic structural diagram of a power saving signal according to an embodiment of the present disclosure.

In the fourth specific implementation of the above-mentioned embodiment of the present disclosure: different from the above-mentioned first implementation, this solution only includes the bitmap part and the power saving information part in the above-mentioned first implementation, as shown in FIG. 11. Whether the type of power saving signal is UE specific or group common can be indicated explicitly or implicitly by the base station as shown in the second implementation. For example, the base station can implicitly indicate the type of power saving signals as UE specific or group common by configuring the search space for the UE to monitor power saving signals as USS or CSS respectively; or the base station can also implicitly indicate the type of the power saving signal by indicating the DCI size. In this case, the one-bit power saving signal type indication in this embodiment is unnecessary. The method regarding the bitmap and its corresponding power saving information field shown in FIG. 9 is consistent with the first implementation.

The type indication of the power saving signal can be done according to the above-mentioned method in this embodiment, or by directly using the bitmap as the power saving signal type indication. At this time, the base station notifies the UE of the corresponding UE specific power saving information and/or group common power saving information in a predetermined static configuration manner or a semi-static configuration manner through high-layer signaling such as RRC signaling; the base station notifies, through RRC signaling, each UE in the group of the bitmap size and the position corresponding to the UE in the bitmap. If the bitmap indicates that only one UE is to be woken, the base station transmits UE specific power saving information in the power saving information field, and accordingly, the UE parses the UE specific power saving information in the power saving information field according to the UE specific power saving information. If the quantity of woken UEs indicated by the bitmap is more than one, the power saving signal is transmitted according to the transmission method of group common power saving information described in embodiment 1.

Similar to the third specific implementation above, there may be a situation where the base station notifies through explicit or implicit signaling the UE that there is only one UE in the group. At this time, the bitmap field degenerates to a one-bit indication, that is, the situation in embodiment 3, the method adopted is same as the third implementation, the one-bit bitmap can be used as a frozen bit in UE decoding.

In the fifth specific implementation of the above-mentioned embodiment of the present disclosure, the UE specific PDCCH is generally transmitted in the USS (UE specific search space), and the group common PDCCH is generally transmitted in the CSS (common search space). As shown in the first and fourth implementations, when there is the bitmap in the power saving signal, since the quantity of power saving information fields is often significantly smaller than the quantity of UEs that may be indicated by the bitmap, in scenarios where the quantity of UEs to be woken at the same time is large, it may be impossible to transmit some UEs' power saving information in the power saving information fields. A better method is for the base station to configure CSS and USS to transmit power saving signals at the same time, and the base station can use CSS to transmit group common power saving signals. If all or part of the power saving information corresponding to the UEs woken by the group common power saving signal is not transmitted in the group common power saving signal, the base station can use the USS to transmit the UE specific power saving information, to transmit the remaining or part or all of the power saving information of the corresponding UE. The UE side can detect both the USS and the CSS according to the base station configuration; or the UE side prioritizes the detection of the CSS, and detects the power saving signal transmitted in the USS only if the UEs satisfying the conditions are found in the group common power saving signal.

In another optional embodiment of the present disclosure, the power saving information configuration indication information includes the power saving information configuration indication for W consecutive discontinuous reception DRX cycles, the W is greater than or equal to 1, and the power saving information set includes V groups of power saving information corresponding to the power saving configuration indication, V is greater than or equal to 1 and less than or equal to W.

In the sixth specific implementation of the above-mentioned embodiment of the present disclosure, the power saving signal can correspond to one DRX cycle or multiple DRX cycles. When multiple DRX cycles are indicated, each value of the corresponding bitmap only needs to be extended to a set of values corresponding to multiple DRX, the power saving information only needs to be configured for multiple DRX according to certain rules. For example, the power saving signal sometimes needs to support indication of the power saving information of consecutive W (W>=1) DRX cycles, for example, one power saving signal can indicate whether the UE needs to be woken in multiple DRX cycles after the power saving signal. First, the base station can dynamically/semi-statically/statically configure the quantity of DRX cycles W that a power saving signal needs to indicate. The power saving signal carries at least the wake-up or sleep indication information corresponding to W DRX cycles, the power saving signal can also carry V groups of power saving information corresponding to W DRX cycles, optionally V<=W; specifically, when V=1, that is, when there is one group of power saving information, the power saving information corresponding to W DRX cycles are the same, and the power saving signal carries one group of common power saving information for multiple DRX cycles; when V=W, each DRX cycle corresponds to a different group of power saving information, that is, the power saving signal needs to carry one group of power saving information for each DRX cycle; when 1<V<W, the DRX is divided into V groups, each group of DRX corresponds to one group of power saving information.

In an optional embodiment of the present disclosure, the group common power saving signals are transmitted in the common search space (CSS). If the power saving information field of the woken UE is not transmitted, the remaining power saving information field of the woken UE is transmitted in the UE specific search space (USS); or, the power saving signal is transmitted in the USS only; or, the group common power saving signal is transmitted in the CSS, and the UE specific power saving signal is transmitted in the USS.

In the seventh specific implementation of the above-mentioned embodiment of the present disclosure, the search space is categorized into two types: CSS and USS, which correspond to different formats of group common DCI and UE specific DCI respectively. The DCI designed in the embodiments of the present disclosure can support both types of UE specific and group common at the same time, so the base station can use high-layer RRC signaling to configure search space for power saving signals, and the search space is optionally CSS (common search space). Another solution is that the search space for power saving signals includes only USS (UE specific search space). It also cannot be ruled out that the search space for power saving signals includes both USS and CSS, which depends entirely on the configuration of the base station. The base station configures for the power saving signal a new DCI-format N which is different from the DCI format in the related art, for example, N=4. RRC signaling can configure the format type and aggregation level/candidate information for the search space corresponding to the power saving signal, When it is configured that the power saving signal is received only in CSS or USS, the methods described in the first and third implementations are more suitable because the search space cannot be used to distinguish the type of power saving signal; when the type of power saving signal is bound with the search space type, the above-mentioned second and fourth implementations are more suitable; when the power saving signal is configured with CSS and USS at the same time, the method described in the above-mentioned fifth implementation is more suitable.

The demodulation reference signal (DMRS) corresponding to the power saving signal is scrambled with the power saving signal-wireless network temporary identification (Power Saving-RNTI, PS-RNTI); the UE side detects the PS-RNTI-scrambled PDCCH based on the power saving signal according to the search space configuration of the power saving signal, and the channel estimation in the UE PDCCH decoding depends on the DMRS (demodulation reference signal) corresponding to the PDCCH, and the initial value of the DMRS sequence depends on the base station configuration. For PDCCH based on power saving signal, the corresponding DMRS can be scrambled with PS-RNTI, which is specially designed for power saving signal and can correspond to one UE or a group of UEs. NR specifies that there are two DMRS configurations for PDCCH: one is narrowband DMRS with the same bandwidth as PDCCH, and the other is broadband DMRS with a bandwidth greater than the PDCCH. The purpose is to improve the channel estimation performance and enhance coverage. At least when broadband DMRS is used for power saving signals, PS-RNTI scrambling is used because the broadband DMRS bandwidth is larger than the PDCCH bandwidth, and the broadband DMRS sequence detection performance is often better than the PDCCH decoding performance, and DMRS detection can be performed before PDCCH decoding, and the arrival of power saving signals can be determined once DMRS is detected, however, the bandwidth of the broadband DMRS that exceeds the bandwidth of the power saving signal PDCCH will overlap with the ordinary PDCCH, and in the case that only the ordinary PDCCH exists, it may be incorrectly detected that there is power saving signal, leading to the occurrence of false wake-up, which can be effectively avoided once the DMRS corresponding to the power saving signal is scrambled with PS-RNTI.

In the method for transmitting a physical downlink control channel in the above-mentioned embodiment of the present disclosure, a DCI format can support the transmission of UE specific power saving signals and group common power saving information at the same time, thereby reducing overhead.

An embodiment of the present disclosure also provides an apparatus for transmitting a physical downlink control channel, including:

a transceiver module, configured to transmit a physical downlink control channel (PDCCH) to a UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

Optionally, the DCI supporting transmission of UE specific control information and group common control information includes at least one of power saving signal type indication information, power saving information configuration indication information, or a power saving information set.

Optionally, when a network device explicitly indicates power saving signal type indication information, the power saving signal type indication information is indicated by at least one bit, and the type indication information of the UE specific power saving signal and the type indication information of the group common power saving signal are indicated by different bits or different states of a same bit.

Optionally, when a network device implicitly indicates power saving signal type indication information, the DCI includes at least one of power saving information configuration indication information or a power saving information set.

Optionally, the network device implicitly indicates that the power saving signal type is a UE specific power saving signal by configuring a UE specific search space (USS) for a UE via radio resource control (RRC) signaling; or, the network device implicitly indicates that the power saving signal type is a group common power saving signal by configuring a common search space (CSS) for a UE via radio resource control (RRC) signaling.

Optionally, when a power saving signal type indicated by the power saving signal type indication information is the UE specific power saving signal, the power saving information configuration indication information includes N bits, the N bits of power saving information configuration indication information including N1 bits of power saving information configuration indication, the power saving information set including N2 power saving information fields, the N being greater than or equal to N1, the N1 being greater than or equal to N2.

Optionally, N1 is notified to the UE through static configuration, or, is notified explicitly or implicitly to the UE via high-layer signaling.

Optionally, the corresponding relationship between the N1 power saving information configuration indications and the N2 power saving information fields is statically configured through a predetermined manner or semi-statically configured through high-layer signaling.

Optionally, each power saving information configuration indication occupies at least one bit, each power saving information configuration indication corresponds to at least one power saving information field, and the power saving information field corresponding to each power saving information configuration indication is of a same length.

Optionally, first N2 power saving information configuration indications of the N1 power saving information configuration indications sequentially correspond to the N2 power saving information fields in a one-to-one manner when the N1 is greater than N2.

Optionally, when a power saving signal type indicated by the power saving signal type indication information is the UE specific power saving signal, the DCI includes the power saving signal type indication information and power saving information configuration indication information; or, the DCI includes the power saving signal type indication information and the power saving information set.

Optionally, when a power saving signal type indicated by the power saving signal type indication information is the group common power saving signal, the power saving information configuration indication information includes N bits and the N is greater than or equal to the quantity of UEs within the group, wherein there are M1 woken UEs within the group, and the power saving information set including M2 power saving information fields; the M1 is less than or equal to the quantity of UEs in the group, and the power saving information fields are power saving information fields corresponding to the woken UEs.

Optionally, in the power saving information configuration indication information, the power saving information configuration indication corresponding to each UE occupies at least one bit, and a quantity of bits occupied by the power saving information configuration indication corresponding to each UE is the same or not the same; or, at least one UE corresponds to one bit of power saving information configuration indication in the power saving information configuration indication information.

Optionally, each UE is notified, semi-statically via high-layer signaling, or through a predetermined static configuration, of a position of the UE's corresponding configuration information in the power saving information configuration indication information.

Optionally, one of the at least one bit occupied by the power saving information configuration indication corresponding to each UE is activated, the UE is a woken UE.

Optionally, each woken UE corresponds to at least one power saving information field and the at least one power saving information field corresponding to the woken UE has the same length when the power saving information configuration indication corresponding to each UE occupies one bit.

Optionally, first M2 UEs of the M1 UEs sequentially correspond to the M2 power saving information fields in a one-to-one manner when the M1 is larger than M2 and one UE corresponds to one power saving information field.

Optionally, the power saving information field corresponding to each UE carries at least one bit of wake-up or sleep indication information; or, a UE of the M1 UEs that does not have a corresponding power saving information field is activated on a currently activated bandwidth part (BWP).

Optionally, when the power saving information configuration indication corresponding to each UE occupies an unequal number of bits, each woken UE corresponds to at least one power saving information field, and the i-th power saving information field of each UE has the same length, i being greater than or equal to 1 and less than or equal to K, K being the quantity of power saving information fields corresponding to the UE.

Optionally, the power saving information configuration indication corresponding to the woken UE occupies Z bits, the quantity of power saving information fields corresponding to this woken UE is K, and in case Z is less than K, the power saving information corresponding to the woken UE is the first Z of the K power saving information fields.

Optionally, one power saving information field includes at least one kind of power saving information field for all woken UEs in the group.

Optionally, the power saving information configuration indication information includes the power saving information configuration indication for W consecutive discontinuous reception DRX cycles, the W being greater than or equal to 1, and the power saving information set includes V groups of power saving information corresponding to the power saving information configuration indication, V being greater than or equal to 1 and less than or equal to W.

Optionally, the group common power saving signal is transmitted in a common search space (CSS), and if the power saving information field of a woken UE is not transmitted, remaining power saving information field of the woken UE is transmitted in a UE specific search space (USS); or the power saving signal is transmitted in the USS only; or the group common power saving signal is transmitted in the CSS and the UE specific power saving signal is transmitted in the USS.

Optionally, the demodulation reference signal (DMRS) corresponding to the power saving signal is scrambled by using the power saving signal-radio network temporary identification (PS-RNTI).

All the embodiments of the method shown in FIG. 3 to FIG. 11 are applicable to the embodiment of the apparatus, and the same technical effect can be achieved.

Figure 12:
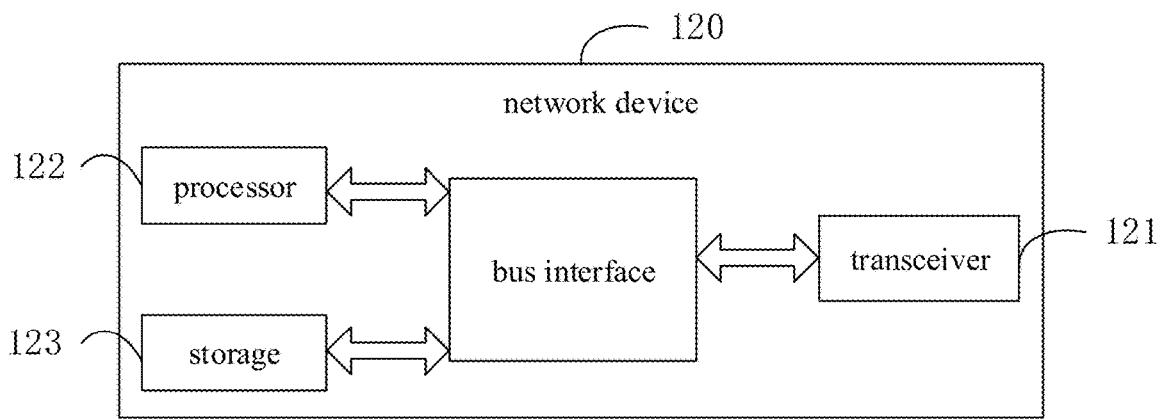
FIG. 12 is a schematic architectural diagram of a network device according to an embodiment of the present disclosure.

As shown in FIG. 12, an embodiment of the present disclosure also provides a network device 120, including: a processor 122 and a storage 123, and the storage 123 stores therein a program executable by the processor 122, and the processor 122 is configured to execute the program to implement: transmitting a physical downlink control channel (PDCCH) to a UE, the PDCCH carrying downlink control information (DCI) in one format, wherein the DCI supports transmission of UE specific control information and group common control information, the UE specific control information at least includes a UE specific power saving signal, and the group common control information at least includes a group common power saving signal.

Optionally, the DCI supporting transmission of UE specific control information and group common control information includes at least one of power saving signal type indication information, power saving information configuration indication information, or a power saving information set.

Optionally, when a network device explicitly indicates power saving signal type indication information, the power saving signal type indication information is indicated by at least one bit, and the type indication information of the UE specific power saving signal and the type indication information of the group common power saving signal are indicated by different bits or different states of a same bit.

Optionally, when a network device implicitly indicates power saving signal type indication information, the DCI includes at least one of power saving information configuration indication information or a power saving information set.

Optionally, the network device implicitly indicates that the power saving signal type is UE specific power saving signal by configuring a UE specific search space (USS) for a UE via radio resource control (RRC) signaling; or, the network device implicitly indicates that the power saving signal type is group common power saving signal by configuring a common search space (CSS) for a UE via radio resource control (RRC) signaling.

Optionally, when a power saving signal type indicated by the power saving signal type indication information is the UE specific power saving signal, the power saving information configuration indication information includes N bits, the N bits of power saving information configuration indication information including N1 bits of power saving information configuration indication, the power saving information set including N2 power saving information fields, the N being greater than or equal to N1, the N1 being greater than or equal to N2.

Optionally, N1 is notified to the UE through static configuration, or, is notified explicitly or implicitly to the UE via high-layer signaling.

Optionally, the corresponding relationship between the N1 power saving information configuration indications and the N2 power saving information fields is statically configured through a predetermined manner or semi-statically configured through high-layer signaling.

Optionally, each power saving information configuration indication occupies at least one bit, each power saving information configuration indication corresponds to at least one power saving information field, and the power saving information field corresponding to each power saving information configuration indication is of a same length.

Optionally, first N2 power saving information configuration indications of the N1 power saving information configuration indications sequentially correspond to the N2 power saving information fields in a one-to-one manner when the N1 is greater than N2.

Optionally, when a power saving signal type indicated by the power saving signal type indication information is the UE specific power saving signal, the DCI includes the power saving signal type indication information and power saving information configuration indication information; or, the DCI includes the power saving signal type indication information and the power saving information set.

Optionally, when a power saving signal type indicated by the power saving signal type indication information is the group common power saving signal, the power saving information configuration indication information includes N bits and the N is greater than or equal to the quantity of UEs within the group, wherein there are M1 woken UEs within the group, and the power saving information set includes M2 power saving information fields; the M1 is less than or equal to the quantity of UEs in the group, and the power saving information fields are power saving information fields corresponding to the woken UEs.

Optionally, the power saving information configuration indication corresponding to each UE in the power saving information configuration indication information occupies at least one bit, and a quantity of bits occupied by the power saving information configuration indication corresponding to each UE is the same or not the same; or, at least one UE corresponds to one bit of power saving information configuration indication in the power saving information configuration indication information.

Optionally, each UE is notified, semi-statically via high-layer signaling, or through a predetermined static configuration, of a position of the UE's corresponding configuration information in the power saving information configuration indication information.

Optionally, one bit of the at least one bit occupied by the power saving information configuration indication corresponding to each UE is activated, the UE is a woken UE.

Optionally, when the power saving information configuration indication corresponding to each UE occupies one bit, each woken UE corresponds to at least one power saving information field and the at least one power saving information field corresponding to the woken UE has the same length.

Optionally, first M2 UEs of the M1 UEs sequentially correspond to the M2 power saving information fields in a one-to-one manner when the M1 is larger than M2 and one UE corresponds to one power saving information field.

Optionally, the power saving information field corresponding to each UE carries at least one bit of wake-up or sleep indication information; or, a UE of the M1 UEs that does not have a corresponding power saving information field is activated on a currently activated bandwidth part (BWP).

Optionally, when the quantity of bits occupied by the power saving information configuration indication corresponding to each UE is not the same, each woken UE corresponds to at least one power saving information field, and an i-th power saving information field of each UE has a same length, i being greater than or equal to 1 and less than or equal to K, K being a quantity of power saving information fields corresponding to the UE.

Optionally, the power saving information configuration indication corresponding to the woken UE occupies Z bits, the quantity of power saving information fields corresponding to the woken UE is K, and in case Z is less than K, the power saving information corresponding to the woken UE is the first Z fields of the K power saving information fields.

Optionally, one power saving information field includes at least one kind of power saving information field of all woken UEs in the group.

Optionally, the power saving information configuration indication information includes the power saving information configuration indication for W consecutive discontinuous reception DRX cycles, the W being greater than or equal to 1, and the power saving information set includes V groups of power saving information corresponding to the power saving information configuration indication, V being greater than or equal to 1 and less than or equal to W.

Optionally, the group common power saving signal is transmitted in a common search space (CSS), and if the power saving information field of a woken UE is not transmitted, remaining power saving information field of the woken UE is transmitted in a UE specific search space (USS); or the power saving signal is transmitted in the USS only; or the group common power saving signal is transmitted in the CSS and the UE specific power saving signal is transmitted in the USS.

Optionally, the demodulation reference signal (DMRS) corresponding to the power saving signal is scrambled by using the power saving signal-radio network temporary identification (PS-RNTI).

All the embodiments of the method shown in FIG. 3 are applicable to this embodiment, and the same technical effect can also be achieved. The network device may also include: a transceiver 121. The transceiver 121 and the processor 122, as well as the transceiver 121 and the storage 123 may be connected through a bus interface. The functions of the transceiver 121 may be implemented by the processor 122 and the functions of the processor 122 can also be implemented by the transceiver 121.

Figure 13:
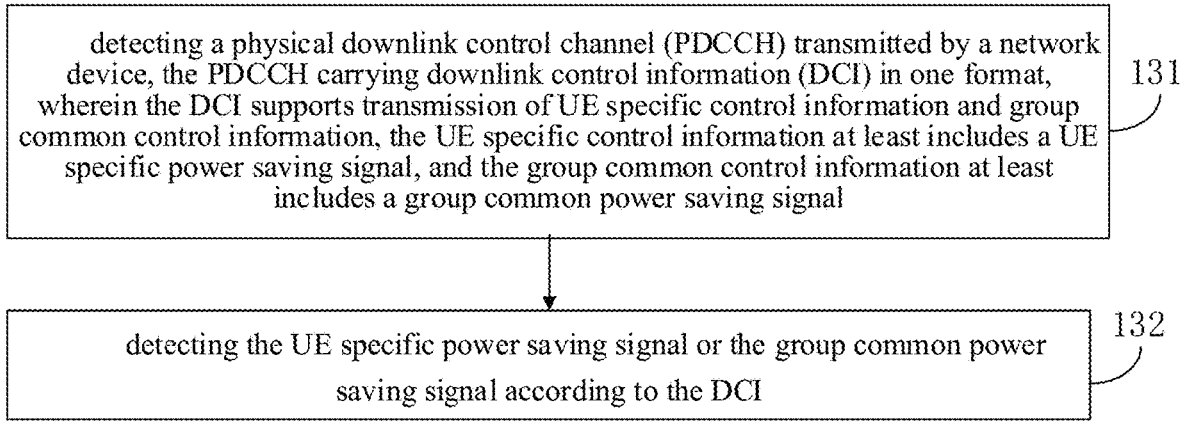
FIG. 13 a schematic flowchart of a method for detecting a physical downlink control channel at the UE side according to an embodiment of the present disclosure.

As shown in FIG. 13, an embodiment of the present disclosure also provides a method for detecting a physical downlink control channel, including:

step 131: detecting a physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal;

step 132: detecting the UE specific power saving signal and the group common power saving signal according to the DCI.

It should be noted that all implementations involving UEs in the methods shown in FIG. 3 to FIG. 11 are applicable to the embodiment, and the same technical effects can also be achieved.

An embodiment of the present disclosure also provides an apparatus for detecting a physical downlink control channel, including:

a transceiver module, configured to detect a physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal;

a processing module, configured to detect the UE specific power saving signal or the group common power saving signal according to the DCI.

The apparatus is an apparatus corresponding to the method at the UE side described above, and all the implementations in the above method embodiments are applicable to the embodiment of the apparatus, and the same technical effects can also be achieved.

Figure 14:
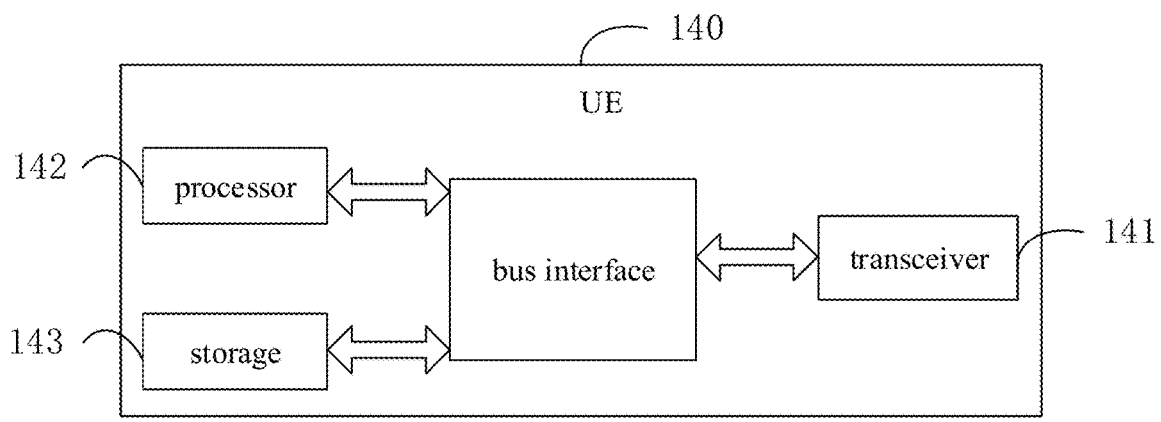
FIG. 14 is a schematic architectural diagram of a UE according to an embodiment of the present disclosure.

As shown in FIG. 14, an embodiment of the present disclosure further provides a UE 140, comprising: a processor 142 and a storage 143, and the storage 143 stores therein a program executable by the processor 142, and the processor 142 is configured to execute the program to implement: detecting a physical downlink control channel (PDCCH) transmitted by a network device, the PDCCH carrying downlink control information (DCI) in one format, wherein the DCI supports transmission of UE specific control information and group common control information, the UE specific control information at least includes a UE specific power saving signal, and the group common control information at least includes a group common power saving signal; detecting the UE specific power saving signal or the group common power saving signal according to the DCI.

The UE 140 may also include a transceiver 141. The transceiver 141 and the processor 142, as well as the transceiver 141 and the storage 143 may be connected through a bus interface. The functions of the transceiver 141 may be implemented by the processor 142, and the functions of the processor 142 can also be implemented by the transceiver 141.

The UE is a UE corresponding to the above-mentioned method at the UE side, and all the implementations in the above-mentioned method embodiment are applicable to the embodiment of the apparatus, and the same technical effect can also be achieved.

An embodiment of the present disclosure also provides a computer storage medium, storing therein an instruction, wherein when the instruction is executed by a computer, the instruction cause the computer to implement the above-mentioned method at the network device side or the method at the UE side. All the embodiments of the above method are applicable to this embodiment, and the same technical effect can be achieved.

A person skilled in the art may realize that the units and algorithm steps described in the embodiments disclosed herein can be implemented by electronic hardware or a combination of computer software and electronic hardware. Whether these functions are performed by hardware or software depends on the specific application and design constraint conditions of the technical solution. A person skilled in the art can use different methods for each specific application to implement the described functions, but such implementation should not be considered as going beyond the scope of the present disclosure.

A person skilled in the art can clearly understand that, for the convenience and conciseness of the description, for the specific working process of the system, device, and unit described above, references can be made to the corresponding process in the above-mentioned method embodiments, which is not repeated here.

In the embodiments provided in the present disclosure, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or it can be integrated into another system, or some features can be ignored or not implemented. In addition, the displayed or discussed mutual coupling or direct coupling or communication connection may be indirect coupling or communication connection through some interfaces, devices, or units, and maybe in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on such an understanding, essential parts, or parts contributing to the related art, of the technical solution of the present disclosure may be implemented in a form of a software product. The computer software product is stored in a storage medium and includes several instructions to make a computer device (which may be a personal computer, a server, or a network device, etc.) to execute all or part of the steps of the methods described in the various embodiments of the present disclosure. The aforementioned storage media include: USB flash disk, mobile hard disk, read only memory (ROM), random access memory (RAM), magnetic disk or optical disc, and other media that can store program codes.

In addition, it should be pointed out that in the device and method of the present disclosure, obviously, each component or each step can be decomposed and/or recombined. These decomposition and/or recombination should be regarded as equivalent solutions of the present disclosure. In addition, the steps for performing the above series of processing can naturally be performed in a chronological order of description, but do not necessarily need to be performed in the chronological order, and some steps can be performed in parallel or independently of each other. A person skilled in the art can understand that all or any of the steps or components of the method and device of the present disclosure can be implemented by hardware, firmware, software, or any combination thereof in any computing device (including a processor, storage medium, etc.) or a network of computing devices. This can be achieved by a person skilled in the art by using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved by only providing a program product containing the program code for implementing the method or device. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of executing the above-mentioned series of processing can naturally be executed in a chronological order of description, but it is not necessarily executed in the chronological order. Some steps can be performed in parallel or independently of each other.

It can be understood that the embodiments described in the present disclosure may be implemented by hardware, software, firmware, middleware, microcode, or a combination thereof. For hardware implementation, the unit, module, sub-unit and submodule can be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure or a combination thereof.

For a software implementation, the technology described in the embodiments of the present disclosure can be implemented by modules (for example, procedures, functions, etc.) that perform the functions described in the embodiments of the present disclosure. The software codes can be stored in a memory and executed by the processor. The memory can be implemented in the processor or external to the processor.

The above are optional implementations of the present disclosure. It should be pointed out that for a person skilled in the art, several improvements and modifications can be made without departing from the principles of the present disclosure. These improvements and modifications should also fall within the scope of the present disclosure.

What is claimed is:

1. A method for transmitting a physical downlink control channel (PDCCH), comprising:
    transmitting the PDCCH to user equipment (UE), the PDCCH carrying downlink control information (DCI) in one format, wherein the DCI supports transmission of UE specific control information and group common control information, the UE specific control information at least includes a UE specific power saving signal, and the group common control information at least includes a group common power saving signal;
    wherein the DCI comprises at least one of: power saving signal type indication information, power saving information configuration indication information, or a power saving information set;
    wherein, in a case that a power saving signal type indicated by the power saving signal type indication information is the UE specific power saving signal, the power saving information configuration indication information is denoted by N bits, the power saving information configuration indication information comprises N1 power saving information configuration indications, and the power saving information set comprises N2 power saving information fields, the N being greater than or equal to N1, the N1 being greater than or equal to N2;

or,
    in a case that a power saving signal type indicated by the power saving signal type indication information is the group common power saving signal, the power saving information configuration indication information is denoted by N bits, N being greater than or equal to a quantity of UEs within a group, wherein there are M1 woken UEs within the group, the power saving information set comprises M2 power saving information fields, M1 being less than or equal to the quantity of UEs in the group, and the power saving information fields are power saving information fields corresponding to the woken UEs.

2. The method for transmitting the physical downlink control channel according to claim 1, wherein, in a case that a network device explicitly indicates the power saving signal type indication information, the power saving signal type indication information is indicated by at least one bit, and the type indication information of the UE specific power saving signal and the type indication information of the group common power saving signal are indicated by different bits or different states of a same bit;
    or,
    wherein, in a case that a network device implicitly indicates the power saving signal type indication information, the DCI comprises at least one of the power saving information configuration indication information or the power saving information set;
    wherein,
    the network device implicitly indicates that a power saving signal type is a UE specific power saving signal by configuring a UE specific search space (USS) for the UE via radio resource control (RRC) signaling; or
    the network device implicitly indicates that the power saving signal type is a group common power saving signal by configuring a common search space (CSS) for the UE via the radio resource control (RRC) signaling.

3. The method for transmitting the physical downlink control channel according to claim 1, wherein the N1 is notified to the UE through static configuration, or, is notified explicitly or implicitly to the UE via high-layer signaling; and/or,
    wherein a corresponding relationship between the N1 power saving information configuration indications and the N2 power saving information fields is statically configured in a predetermined manner or is semi-statically configured via high-layer signaling; wherein each power saving information configuration indication of the N1 power saving information configuration indications occupies at least 1 bit, the each power saving information configuration indication corresponds to at least one power saving information field of the N2 power saving information fields, and the power saving information field corresponding to the each power saving information configuration indication is of a same length; and/or, first N2 power saving information configuration indications of the N1 power saving information configuration indications sequentially correspond to the N2 power saving information fields in a one-to-one manner in a case that N1 is greater than N2; and/or, wherein, in a case that the power saving signal type indicated by the power saving signal type indication information is the UE specific power saving signal, the DCI comprises the power saving signal type indication information and the power saving information configuration indication information, or, the DCI comprises the power saving signal type indication information and the power saving information set.

4. The method for transmitting the physical downlink control channel according to claim 1, wherein a power saving information configuration indication corresponding to each UE within the group occupies at least one bit in the power saving information configuration indication information, and a quantity of bits occupied by the power saving information configuration indication corresponding to the each UE is the same or not the same; or at least one UE corresponds to one bit of power saving information configuration indication in the power saving information configuration indication information.

5. The method for transmitting the physical downlink control channel according to claim 4, wherein, the each UE within the group is notified, semi-statically via high-layer signaling, or through a predetermined static configuration, of a position of the UE's corresponding configuration information in the power saving information configuration indication information; wherein in a case that the quantity of bits occupied by the power saving information configuration indication corresponding to the each UE within the group is not the same, each woken UE corresponds to at least one power saving information field, and an i-th power saving information field of the each UE within the group has a same length, i being greater than or equal to 1 and less than or equal to K, K being a quantity of power saving information fields corresponding to the UE; and/or, the power saving information configuration indication corresponding to the woken UE occupies Z bits, a quantity of power saving information fields corresponding to the woken UE is K, and in a case that Z is less than K, power saving information corresponding to the woken UE is first Z power saving information fields of the K power saving information fields; and/or, one power saving information field comprises at least one kind of power saving information field corresponding to all woken UEs within the group;

and/or, wherein in a case that one bit of the at least one bit occupied by the power saving information configuration indication corresponding to each UE is activated, the UE is a woken UE;

and/or, wherein each woken UE corresponds to at least one power saving information field and the at least one power saving information field corresponding to the woken UE has a same length in a case that the power saving information configuration indication corresponding to the each UE within the group occupies one bit; first M2 UEs of the M1 UEs sequentially correspond to the M2 power saving information fields in a one-to-one manner in a case that M1 is larger than M2 and one UE corresponds to one power saving information field; the power saving information field corresponding to the each UE within the group carries at least one bit of wake-up or sleep indication information; or, a UE of the M1 UEs that does not have a corresponding power saving information field is activated on a currently activated bandwidth part (BWP).

6. The method for transmitting the physical downlink control channel according to claim 1, wherein the power saving information configuration indication information comprises power saving information configuration indication for W consecutive discontinuous reception (DRX) cycles, W being greater than or equal to 1, and the power saving information set comprises V groups of power saving information corresponding to the power saving information configuration indication, V being greater than or equal to 1 and less than or equal to W;

and/or, wherein the group common power saving signal is transmitted in a common search space (CSS), and if the power saving information field of a woken UE is not transmitted, remaining power saving information field of the woken UE is transmitted in a UE specific search space (USS); or the power saving signal is transmitted in the USS only; or the group common power saving signal is transmitted in the CSS and the UE specific power saving signal is transmitted in the USS.

7. The method for transmitting the physical downlink control channel according to claim 1, wherein a demodulation reference signal (DMRS) corresponding to the power saving signal is scrambled with power saving signal-radio network temporary identification (PS-RNTI).

8. A method for detecting a physical downlink control channel (PDCCH), comprising:

detecting the physical downlink control channel transmitted by a network device, the PDCCH carrying downlink control information (DCI) in one format, wherein the DCI supports transmission of UE specific control information and group common control information, the UE specific control information at least comprises a UE specific power saving signal, and the group common control information at least comprises a group common power saving signal;

detecting the UE specific power saving signal and the group common power saving signal according to the DCI;

wherein the DCI comprises at least one of: power saving signal type indication information, power saving information configuration indication information, or a power saving information set;

wherein, in a case that a power saving signal type indicated by the power saving signal type indication information is the UE specific power saving signal, the power saving information configuration indication information is denoted by N bits, the power saving information configuration indication information comprises N1 power saving information configuration indications, and the power saving information set comprises N2 power saving information fields, the N being greater than or equal to N1, the N1 being greater than or equal to N2;

or, in a case that a power saving signal type indicated by the power saving signal type indication information is the group common power saving signal, the power saving information configuration indication information is denoted by N bits, N being greater than or equal to a quantity of UEs within a group, wherein there are M1 woken UEs within the group, the power saving information set comprises M2 power saving information fields, M1 being less than or equal to the quantity of UEs in the group, and the power saving information fields are power saving information fields corresponding to the woken UEs.

9. A network device, comprising: a processor and a storage storing therein a program executable by the processor, wherein the processor is configured to execute the program to implement: transmitting a physical downlink control channel (PDCCH) to UE, the PDCCH carrying downlink control information (DCI) in one format, wherein the DCI supports transmission of UE specific control information and group common control information, the UE specific control information at least comprises a UE specific power saving signal, and the group common control information at least comprises a group common power saving signal;

wherein the DCI comprises at least one of: power saving signal type indication information, power saving information configuration indication information, or a power saving information set;

wherein, in a case that a power saving signal type indicated by the power saving signal type indication information is the UE specific power saving signal, the power saving information configuration indication information is denoted by N bits, the power saving information configuration indication information comprises N1 power saving information configuration indications, and the power saving information set comprises N2 power saving information fields, the N being greater than or equal to N1, the N1 being greater than or equal to N2;

or, in a case that a power saving signal type indicated by the power saving signal type indication information is the group common power saving signal, the power saving information configuration indication information is denoted by N bits, N being greater than or equal to a quantity of UEs within a group, wherein there are M1 woken UEs within the group, the power saving information set comprises M2 power saving information fields, M1 being less than or equal to the quantity of UEs in the group, and the power saving information fields are power saving information fields corresponding to the woken UEs.

10. UE, comprising: a processor and a storage storing therein a program executable by the processor, wherein the processor is configured to execute the program to implement steps of the method for detecting the PDCCH according to claim 8.

11. The network device according to claim 9, wherein, in a case that a network device explicitly indicates the power saving signal type indication information, the power saving signal type indication information is indicated by at least one bit, and the type indication information of the UE specific power saving signal and the type indication information of the group common power saving signal are indicated by different bits or different states of a same bit;

or, wherein, in a case that a network device implicitly indicates the power saving signal type indication information, the DCI comprises at least one of the power saving information configuration indication information or the power saving information set;

wherein, the network device implicitly indicates that a power saving signal type is a UE specific power saving signal by configuring a UE specific search space (USS) for the UE via radio resource control (RRC) signaling; or the network device implicitly indicates that the power saving signal type is a group common power saving signal by configuring a common search space (CSS) for the UE via the radio resource control (RRC) signaling.

12. The network device according to claim 9, wherein the N1 is notified to the UE through static configuration, or, is notified explicitly or implicitly to the UE via high-layer signaling;

and/or, wherein a corresponding relationship between the N1 power saving information configuration indications and the N2 power saving information fields is statically configured in a predetermined manner or is semi-statically configured via high-layer signaling; wherein each power saving information configuration indication of the N1 power saving information configuration indications occupies at least 1 bit, the each power saving information configuration indication corresponds to at least one power saving information field of the N2 power saving information fields, and the power saving information field corresponding to the each power saving information configuration indication is of a same length; and/or, first N2 power saving information configuration indications of the N1 power saving information configuration indications sequentially correspond to the N2 power saving information fields in a one-to-one manner in a case that N1 is greater than N2;

and/or, wherein, in a case that the power saving signal type indicated by the power saving signal type indication information is the UE specific power saving signal, the DCI comprises the power saving signal type indication information and the power saving information configuration indication information, or, the DCI comprises the power saving signal type indication information and the power saving information set.

13. The network device according to claim 9, wherein a power saving information configuration indication corresponding to each UE within the group occupies at least one bit in the power saving information configuration indication information, and a quantity of bits occupied by the power saving information configuration indication corresponding to the each UE is the same or not the same; or at least one UE corresponds to one bit of power saving information configuration indication in the power saving information configuration indication information.

14. The network device according to claim 13, wherein, the each UE within the group is notified, semi-statically via high-layer signaling, or through a predetermined static configuration, of a position of the UE's corresponding configuration information in the power saving information configuration indication information; wherein in a case that the quantity of bits occupied by the power saving information configuration indication corresponding to the each UE within the group is not the same, each woken UE corresponds to at least one power saving information field, and an i-th power saving information field of the each UE within the group has a same length, i being greater than or equal to 1 and less than or equal to K, K being a quantity of power saving information fields corresponding to the UE; and/or, the power saving information configuration indication corresponding to the woken UE occupies Z bits, a quantity of power saving information fields corresponding to the woken UE is K, and in a case that Z is less than K, power saving information corresponding to the woken UE is first Z power saving information fields of the K power saving information fields; and/or, one power saving information field comprises at least one kind of power saving information field of all woken UEs in the group;

and/or, wherein in a case that one bit of the at least one bit occupied by the power saving information configuration indication corresponding to the each UE within the group is activated, the UE is a woken UE;

and/or, wherein each woken UE corresponds to at least one power saving information field and the at least one power saving information field corresponding to the woken UE has a same length in a case that the power saving information configuration indication corresponding to the each UE within the group occupies one bit; first M2 UEs of the M1 UEs sequentially correspond to the M2 power saving information fields in a one-to-one manner in a case that M1 is larger than M2 and one UE corresponds to one power saving information field; the power saving information field corresponding to the each UE within the group carries at least one bit of wake-up or sleep indication information; or, a UE of the M1 UEs that does not have a corresponding power saving information field is activated on a currently activated bandwidth part (BWP).

* * * * *